US010952176B2

(12) United States Patent
Bharatia

(10) Patent No.: US 10,952,176 B2
(45) Date of Patent: Mar. 16, 2021

(54) AF INFLUENCED PDU SESSION MANAGEMENT AND SUBSCRIPTION PROCEDURES

(71) Applicant: Samsung Electronics Co., Ltd., Suwon-si (KR)

(72) Inventor: Jayshree A. Bharatia, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 295 days.

(21) Appl. No.: 15/923,867

(22) Filed: Mar. 16, 2018

(65) Prior Publication Data

US 2018/0270778 A1 Sep. 20, 2018

Related U.S. Application Data

(60) Provisional application No. 62/472,908, filed on Mar. 17, 2017, provisional application No. 62/487,582, (Continued)

(51) Int. Cl.
*H04W 4/00* (2018.01)
*H04W 60/00* (2009.01)
(Continued)

(52) U.S. Cl.
CPC ......... *H04W 60/00* (2013.01); *H04L 65/1063* (2013.01); *H04L 65/1069* (2013.01);
(Continued)

(58) Field of Classification Search
CPC ....... H04W 60/00; H04W 76/12; H04W 8/08; H04W 8/20; H04W 36/0011; H04W 4/02;
(Continued)

(56) References Cited

U.S. PATENT DOCUMENTS

| 8,515,421 B2 * | 8/2013 | Shaheen | H04W 8/06 455/435.1 |
| 8,516,529 B2 * | 8/2013 | Lajoie | H04L 65/4084 725/87 |

(Continued)

FOREIGN PATENT DOCUMENTS

| WO | 2016045602 A1 | 3/2016 |
| WO | 2017023748 A1 | 2/2017 |
| WO | 2017030343 A1 | 2/2017 |

OTHER PUBLICATIONS

"3rd Generation Partnership Project; Technical Specification Group Services and System Aspects; System Architecture for the 5G System; Stage 2 (Release 15)", Technical Specification 3GPP TS 23.501 V0.3.1, Mar. 2017, 97 pages.

(Continued)

*Primary Examiner* — Marceau Milord

(57) ABSTRACT

Methods, electronic devices, and computer readable media for application function (AF) protocol data unit (PDU) session management and subscription procedures. A method for a method for PDU session management includes initiating a PDU session for an application function (AF) within an application server (AS) that is not part of a cellular network and sending configuration information to a network exposer function (NEF) to communicate directly with a network function (NF) of the cellular network to provide services for the PDU session. The method additionally includes receiving authorization from the NEF and communicating directly with the cellular network NF to provide the PDU services during the PDU session.

20 Claims, 26 Drawing Sheets

Related U.S. Application Data filed on Apr. 20, 2017, provisional application No. 62/489,188, filed on Apr. 24, 2017, provisional application No. 62/513,698, filed on Jun. 1, 2017, provisional application No. 62/517,630, filed on Jun. 9, 2017, provisional application No. 62/521,740, filed on Jun. 19, 2017, provisional application No. 62/537,576, filed on Jul. 27, 2017.

(51) Int. Cl.

| | |
|---|---|
| *H04W 8/08* | (2009.01) |
| *H04W 8/20* | (2009.01) |
| *H04L 29/06* | (2006.01) |
| *H04W 76/12* | (2018.01) |
| *H04W 36/00* | (2009.01) |
| *H04W 84/04* | (2009.01) |
| *H04W 4/02* | (2018.01) |

(52) U.S. Cl.
CPC ...... *H04L 65/1073* (2013.01); *H04L 65/4061* (2013.01); *H04L 65/80* (2013.01); *H04W 8/08* (2013.01); *H04W 8/20* (2013.01); *H04W 36/0011* (2013.01); *H04W 76/12* (2018.02); *H04W 4/02* (2013.01); *H04W 84/042* (2013.01)

(58) Field of Classification Search
CPC ............. H04W 84/042; H04L 65/1063; H04L 65/1069; H04L 65/1073; H04L 65/4061; H04L 65/80
USPC .............................................. 455/435.1, 433
See application file for complete search history.

(56) References Cited

U.S. PATENT DOCUMENTS

| | | | | |
|---|---|---|---|---|
| 8,638,794 B1* | 1/2014 | Ephraim | ................. | H04W 4/00 370/254 |
| 8,818,331 B2* | 8/2014 | Mohammed | .......... | H04M 15/70 455/406 |
| 8,923,863 B2* | 12/2014 | Bhaskaran | ............ | H04W 60/00 455/127.4 |
| 8,971,887 B2* | 3/2015 | Das | ........................ | H04W 48/18 455/435.2 |
| 9,319,433 B2* | 4/2016 | Qiu | .......................... | H04L 63/08 |
| 9,414,225 B2* | 8/2016 | Timariu | .................. | H04L 67/02 |
| 9,445,341 B2* | 9/2016 | Spinelli | ................. | H04W 36/36 |
| 9,571,868 B2* | 2/2017 | Shaw | .................... | H04W 4/029 |
| 9,763,179 B2* | 9/2017 | Pragada | .............. | H04W 84/042 |
| 9,883,384 B2* | 1/2018 | Lee | .......................... | H04L 63/18 |
| 10,445,490 B2* | 10/2019 | Shem Tov | .......... | H04L 63/1433 |
| 2016/0269926 A1* | 9/2016 | Sundaram | ......... | H04W 28/0226 |
| 2017/0086118 A1* | 3/2017 | Vrzic | ..................... | H04W 36/26 |
| 2017/0164349 A1* | 6/2017 | Zhu | ........................ | H04W 40/20 |
| 2017/0251329 A1 | 8/2017 | Bhalla | | |
| 2017/0289791 A1* | 10/2017 | Yoo | ..................... | H04W 68/005 |
| 2017/0318450 A1* | 11/2017 | Salkintzis | ............. | H04W 12/06 |
| 2017/0332421 A1* | 11/2017 | Sternberg | .......... | H04W 12/0609 |
| 2018/0124661 A1* | 5/2018 | Tsai | ....................... | H04W 36/06 |
| 2018/0139107 A1* | 5/2018 | Senarath | ................. | H04L 47/70 |
| 2018/0152836 A1* | 5/2018 | Milton | ................... | H04W 12/02 |
| 2018/0227807 A1 | 8/2018 | Youn et al. | | |
| 2018/0227873 A1* | 8/2018 | Vrzic | ..................... | H04W 76/27 |
| 2018/0227876 A1* | 8/2018 | Puthenpura | ........... | H04W 64/00 |
| 2018/0270744 A1* | 9/2018 | Griot | ........................ | H04W 4/00 |
| 2019/0182723 A1* | 6/2019 | Sharma | .................. | H04W 36/18 |
| 2019/0191348 A1* | 6/2019 | Futaki | ............... | H04W 36/0033 |
| 2019/0223093 A1* | 7/2019 | Watfa | .................... | H04W 48/18 |
| 2020/0053685 A1* | 2/2020 | Chandramouli | ...... | H04W 48/02 |

OTHER PUBLICATIONS

"3rd Generation Partnership Project; Technical Specification Group Services and System Aspects; Procedures for the 5G System; Stage 2 (Release 15)", Technical Specification 3GPP TS 23.502 V02.0, Feb. 2017, 71 pages.

International Search Report regarding Application No. PCT/KR2018/003197, dated Jun. 15, 2018, 3 pages.

Qualcomm Incorporated, "23.502: Authentication/authorization of PDU session establishment", SA WG2 Meeting #S2-119, S2-170746, Feb. 2017, 11 pages.

Huawei, et al. "PDU session management procedure", SA WG2 Meeting #119, S2-170977, Feb. 2017, 10 pages.

Catt, "TP on PDU Session Management for NG interface", 3GPP TSG-RAN WG3 #95, R3-170497, Feb. 2017, 3 pages.

Supplementary European Search Report in connection with European Application No. 18767432.0 dated Dec. 4, 2019, 32 pages.

\* cited by examiner

AF INFLUENCED PDU SESSION MANAGEMENT AND SUBSCRIPTION PROCEDURES

CROSS-REFERENCE TO RELATED APPLICATIONS AND CLAIM OF PRIORITY

The present application claims priority to U.S. Provisional Patent Application Ser. No. 62/472,908, filed on Mar. 17, 2017; U.S. Provisional Patent Application Ser. No. 62/487,582, filed on Apr. 20, 2017; U.S. Provisional Patent Application Ser. No. 62/489,188, filed on Apr. 24, 2017; U.S. Provisional Patent Application Ser. No. 62/513,698, filed on Jun. 1, 2017; U.S. Provisional Patent Application Ser. No. 62/517,630, filed on Jun. 9, 2017; U.S. Provisional Patent Application Ser. No. 62/521,740, filed on Jun. 19, 2017; and U.S. Provisional Patent Application Ser. No. 62/537,576, filed on Jul. 27, 2017. The content of the above-identified patent document is incorporated herein by reference.

TECHNICAL FIELD

The present application relates generally to network management operation for next generation system. More specifically, the present disclosure relates to session management, policy control, roaming support, and handover optimization for next generation systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. Existing cellular networks were not designed for supporting Internet of Things (IoT). LTE has been designed from grounds up to provide efficient mobile broadband data communications. One of the important requirement supported LTE, UMTS/HSPA and GSM/GPRS is to support full mobility. Due to this requirement, the mobile is required to be paged in larger location area anytime it goes to idle mode and receives terminating packets from the network. Next generation wireless standards (e.g., 3GPP SA2) started working on the architecture standards. User management is a critical piece of this work. This includes how user plane is selected by the control plane, how it is managed throughout the session, impact on the user plane when multiple user planes are used for the same session etc. It includes details involving creation, modification and release of the user plane.

SUMMARY

The present disclosure relates to a pre-5th-Generation (5G) or 5G communication system to be provided for supporting network management of 4th-Generation (4G) communication system such as long term evolution (LTE). Embodiments of the present disclosure provide multiple embodiments in advanced communication systems.

In one embodiment, an electronic device for protocol data unit (PDU) session management is provided. The electronic device includes a processor configured to initiate a PDU session for an application function (AF) within an application server (AS) that is not part of a cellular network. The electronic device also includes a transceiver operably connected to the processor. The transceiver is configured to send configuration information to a network exposer function (NEF) to communicate directly with a network function (NF) of the cellular network to provide services for the PDU session, receive authorization from the NEF, and communicate directly with the cellular network NF to provide the PDU services during the PDU session.

In another embodiment, a method for PDU session management is provided. The method includes initiating a PDU session for an AF within an AS that is not part of a cellular network and sending configuration information to a NEF to communicate directly with a network function (NF) of the cellular network to provide services for the PDU session. The method additionally includes receiving authorization from the NEF and communicating directly with the cellular network NF to provide the PDU services during the PDU session.

In yet another embodiment, a non-transitory computer readable medium storing program code for PDU session management is provided. The program code, when executed by a processor of an electronic device, causes the electronic device to initiate a PDU session for an AF within an AS that is not part of a cellular network, send configuration information to a NEF to communicate directly with a NF of the cellular network to provide services for the PDU session, receive authorization from the NEF, and communicate directly with the cellular network NF to provide the PDU services during the PDU session.

Other technical features may be readily apparent to one skilled in the art from the following figures, descriptions, and claims.

Before undertaking the DETAILED DESCRIPTION below, it may be advantageous to set forth definitions of certain words and phrases used throughout the present disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 23.501 v0.3.1, "3rd Generation Partnership Project; Technical Specification Group Services and System Aspects; System Architecture for the 5G System," and 3GPP TS 23.502 v0.2.0, "3rd Generation Partnership Project; Technical Specification Group Services and System Aspects; Procedures for the 5G System."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
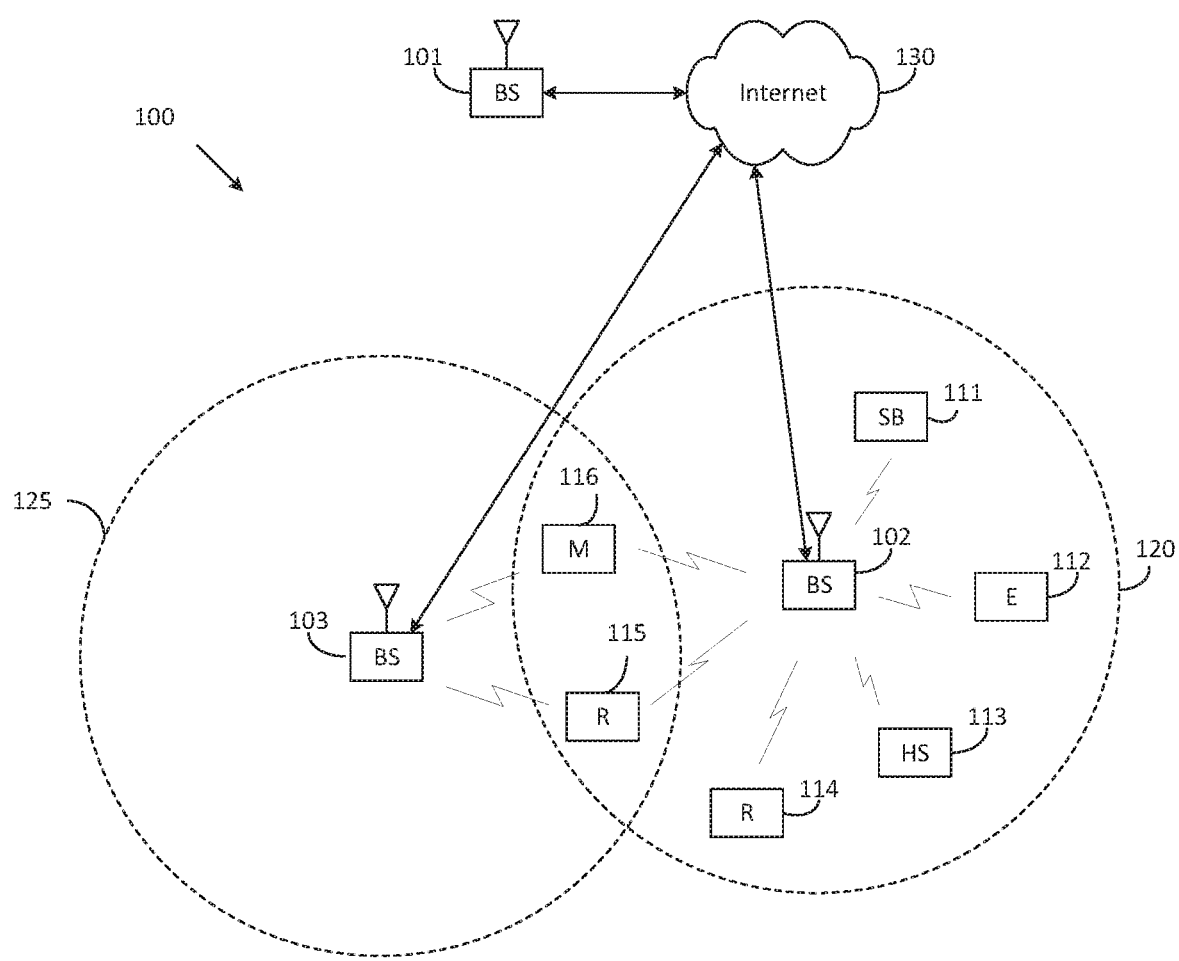
FIG. 1 illustrates an example wireless network according to embodiments of the present disclosure.
Figure 2:
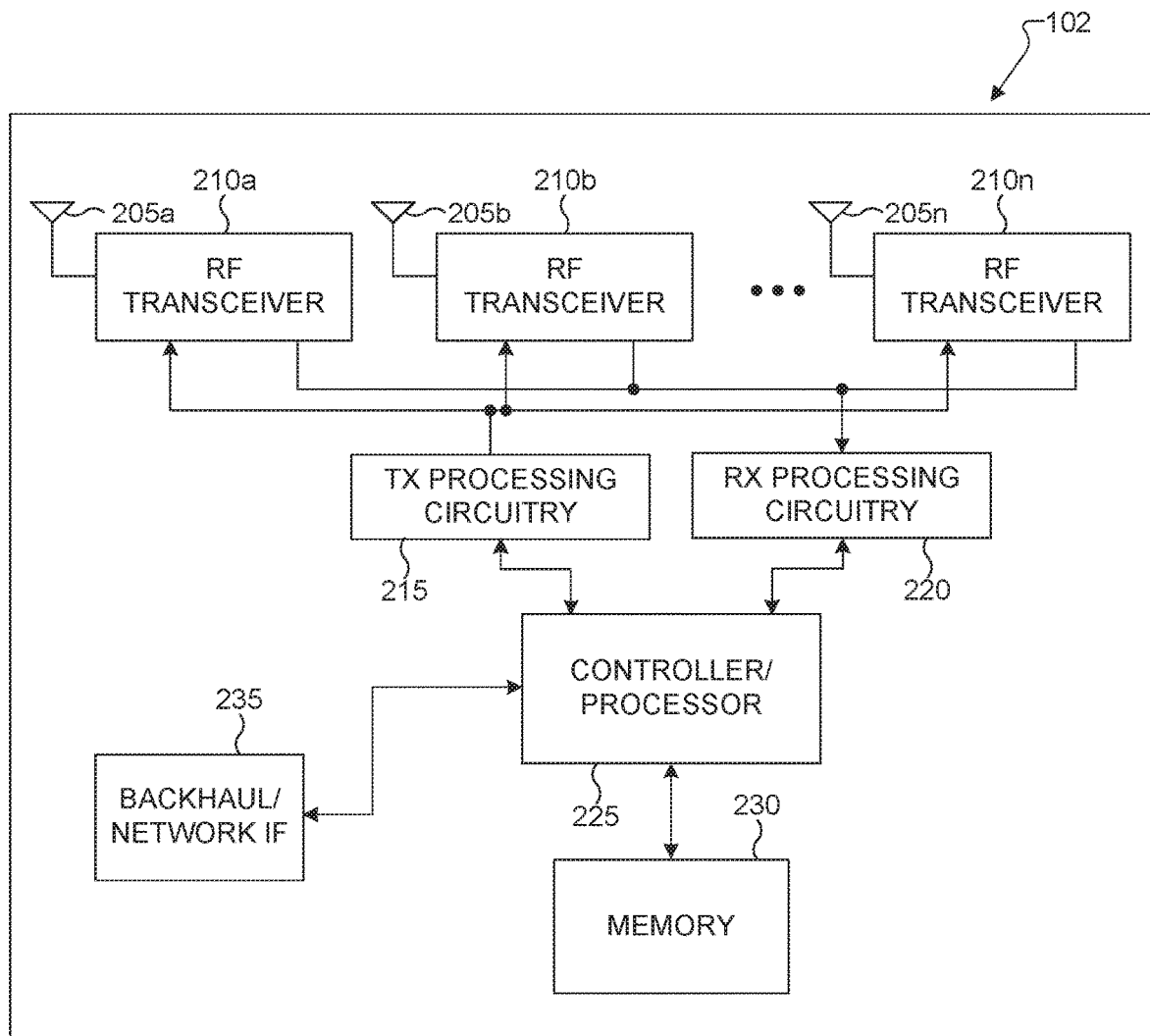
FIG. 2 illustrates an example eNB according to embodiments of the present disclosure.
Figure 3:
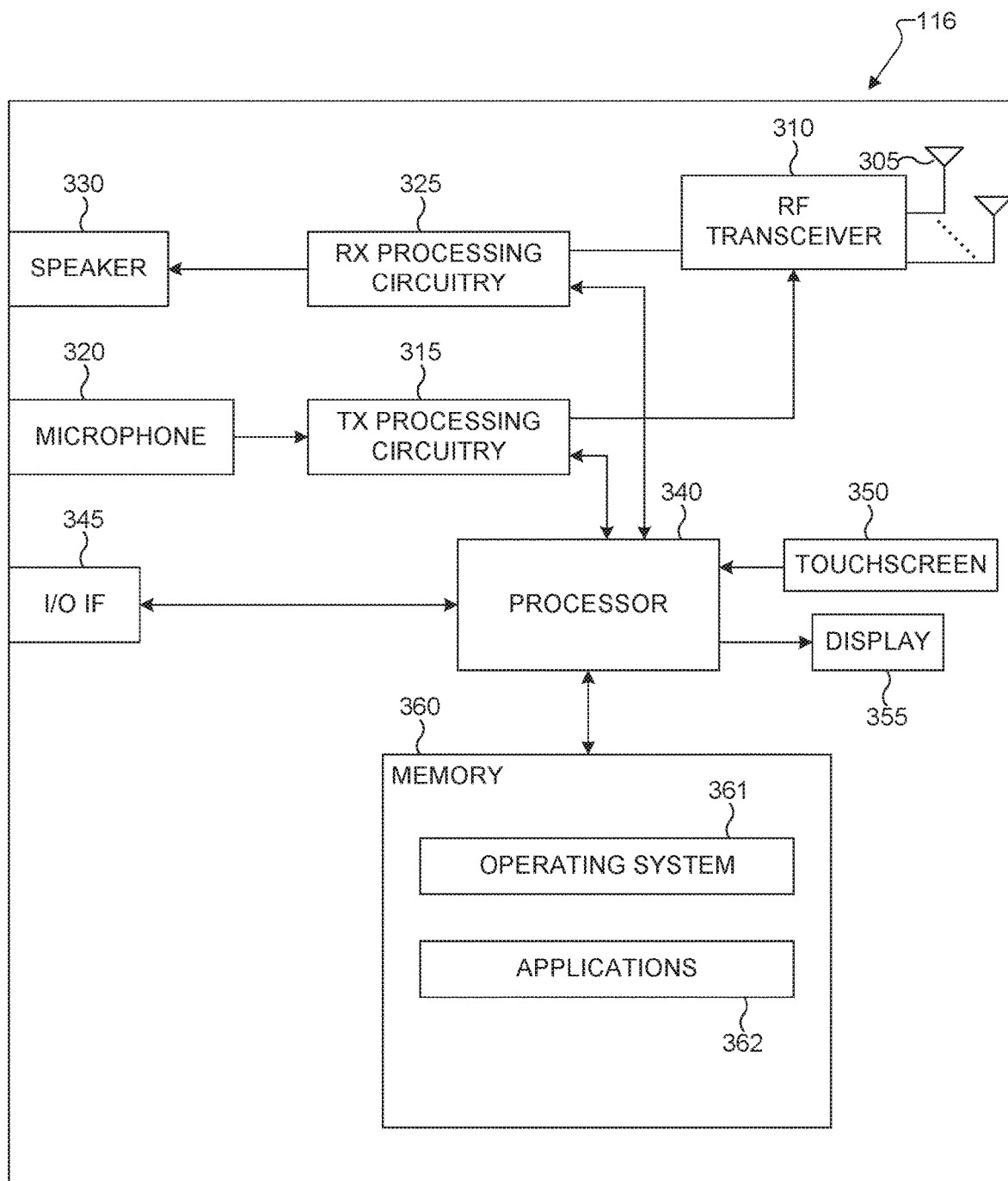
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in the present disclosure to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in the present disclosure to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient network management in advanced wireless communication system. In certain embodiments, and one or more of the eNBs 101-103 includes circuitry, programing, or a combination thereof, for efficient network management in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of the present disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for an inter-RAT handover operation and state transition. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

AF Influenced PDU Session Management and Subscription Procedures

There are many new 5G services/applications are defined in the 3GPP ranging from simple data transfer to completed services like V2X, mission critical push-to-talk, ultra-high reliable services etc. Each service has its own characteristics and each may require some unique ways to handle the traffic. The present disclosure is in this direction where the present disclosure proposes which potential entities are candidates for handling subscription and service/application information registration request from the application functions (AF) resided in an application server (AS). The AS may or may not be part of the 3GPP network. If the AS is part of operator's network, the AS is considered trusted and the AS can be directly communicated with the AF but if the AS is non-trusted, the AS needs to be communicating to the 3GPP network functions (NFs) via network exposer function (NEF) so that additional security can be provided. Based on the status of the network, the new PDU session may be involved which can satisfy AF requirements or the existing PDU session can be updated when the traffic routing information is provided by the AF.

The present disclosure provides mainly the following functions: subscription of the events such as user plane management, mobility, UE location etc.; registration/provisioning of the application/service information in the 3GPP network which is non session based (can be done at any time without binding any specific session); if PDU session is already active between the AF and the UE, updates based on the AF information is provided; if the UE is just registered and does not have a PDU session, the new session may be triggered based on the application/service information.

In some embodiments, subscription of different network events such as mobility, user plane routing information may be in the form of structured or unstructured format. Depending on user plane routing information's severity and other criteria, the user plane routing information can be part of either PCF or other NF within 3GPP which can understand network functionality and may be able to push notification or communicate with other entities to push the notification to the AF for events the AF has subscribed.

In some embodiments, the registration/provisioning of application/service information is provided. In such embodiments, potential candidates are the policy control function (PCF), the UDM, NEF or the session management function (SMF). Although the potential candidates can be any NF (which may be specific to application) who can manage storage and management of this application/service information.

In some embodiments, how to execute PDU session management procedure influencing application/service specific information is considered.

In some embodiments, potential method to be used for initiating the PDU session establishment is considered when requested by the UE since the potential method is normally done by the UE only.

All interactions in the present disclosure assumes that AF resides within the application server (AS) is untrusted, i.e. not controlled by the operator and may and/or may not belong to the same PLMN. Trusted AF can directly communicate with the 3GPP NFs. The most probable AF is SMF or PCF for the direct interaction but the AF can be any other NF in the network as well.

Figure 4:
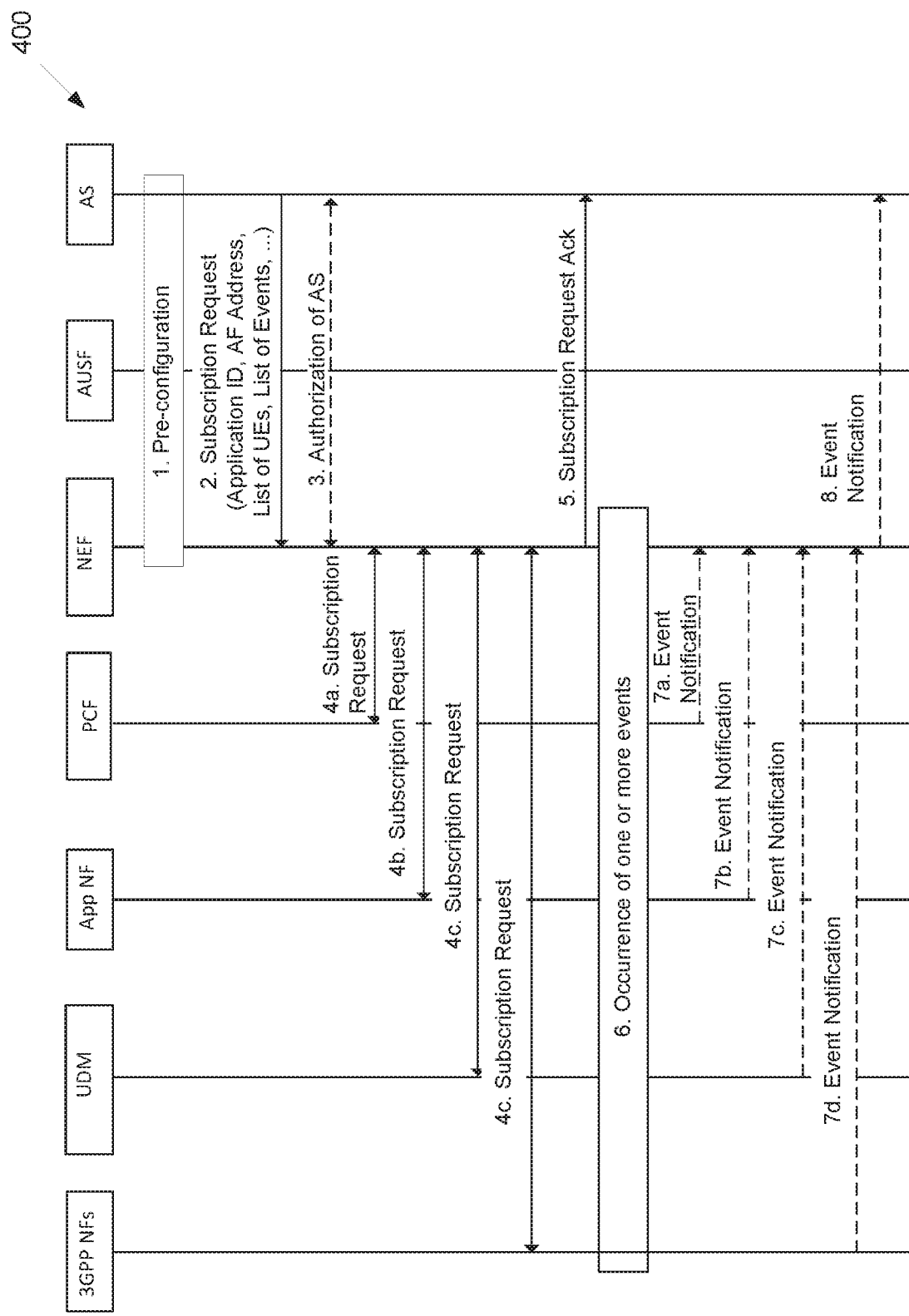
FIG. 4 illustrates an example subscription/notification of application specific events according to embodiments of the present disclosure.

FIG. 4 illustrates an example subscription/notification of application specific events 400 according to embodiments of the present disclosure. The embodiment of the subscription/notification of application specific events 400 illustrated in FIG. 4 is for illustration only. FIG. 4 does not limit the scope of the present disclosure to any particular implementation.

FIG. 4 shows subscription of various events from the AF resided within the AS. Here, there are few alternatives provided for managing subscription of events from the AF. The alternatives can be managed by either policy control function (PCF), application specific network function resided within the 3GPP network or UDM or any existing network functions such as SMF, AMF etc. in the 3GPP network In some embodiments of step 1, routing information between the AF and the NEF is assumed to be preconfigured. It is also possible to discover the NEF through other means like static information provided as a part of service level agreement between the application provider and 3GPP provider.

In some embodiments of step 2, the AF sends subscription information to the NEF along with the parameters including application identifier (ID) for which the subscription is requested, an AF address which is processing the application at the AS, address of single UE, group of UEs or indication that it is applicable to all UEs, list of events the AF likes to subscribed to, notification strategy including notification frequency, notification period etc. and potentially other parameters. These events may be related to the mobility, user plane management etc.

In some embodiments of step 3, upon receipt of the subscription request, the NEF authorizes the AS and make sure that it is allowed to obtain subscribe/notify service, along with the area and type of events it is allowed to subscribed from the 3GPP network.

In some embodiments of step 4, the NEF may store information received in the subscription request as a part of UDM, UDSF or SDSF or forward this message to the PCF or some NF including application specific 3GPP entity supported by the 3GPP network.

In some embodiments of step 5, the NEF sends a response of the subscription request to the AF. These events are applicable to multiple entities in the network. It is expected that these entities may access application specific information received from the AF from one of these or any of these entities (depending on how 3GPP decides to support subscription of the application specific events). For example, the AMF may need to inform the AF regarding the mobility state of a specific UE. In that case, the AMF is expected to retrieve the list of events subscribed by the AF and respond to the AF via the NEF. Note that steps 4 and 5 can occur in any order.

In some embodiments of step 6, there may be one or multiple occurrence of the events subscribed by the AF during the AF association with the NEF.

In some embodiments of step 7, the relevant NF (or NFs) sends appropriate notification to the NEF. If an AF is the trusted AF, the NFs can directly send the notification to the AF without going via NEF. It is also possible that one of the entities in the network may behave as a proxy for the AF within the 3GPP network and pull the status of events subscribed by the AF periodically and communicate with the AF directly or via NEF. In this case, all relevant NFs may communicate with this proxy AF for their specification event notifications.

In some embodiments of step 8, the NEF forwards the event notification to the AF.

Depending on when AF decides to start getting notifications of the events, the AF can be subscribed to those events. The subscription may happen in the middle of any ongoing NF session with the 3GPP network or the subscription may happen right after the UE is registered.

All interactions in the present disclosure assumes that AF resides within the application server (AS) is untrusted, i.e. not controlled by the operator and may and/or may not belong to the same PLMN. Trusted AF can directly communicate with the 3GPP NFs. The most probable AF is SMF or PCF for the direct interaction but the AF can be any other NF in the network as well.

Figure 5:
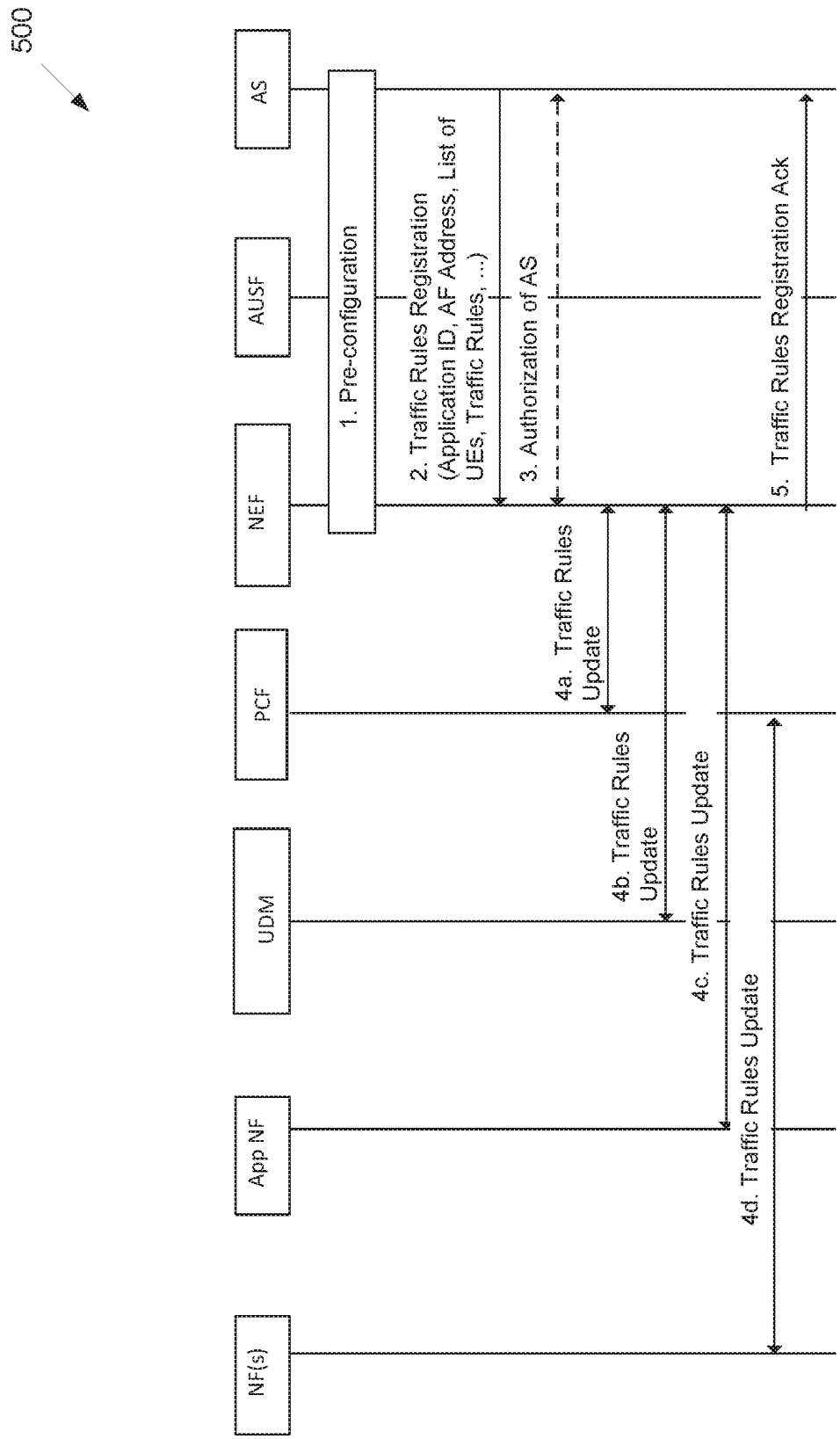
FIG. 5 illustrates an example registration/provisioning of application/service information according to embodiments of the present disclosure.

FIG. 5 illustrates an example registration/provisioning of application/service information 500 according to embodiments of the present disclosure. The embodiment of the registration/provisioning of application/service information 500 illustrated in FIG. 5 is for illustration only. FIG. 5 does not limit the scope of the present disclosure to any particular implementation.

FIG. 5 shows registration of traffic rules for the AF resided within the AS. The AF may decide to subscribe different events (such as user plane information, mobility including UE location) and registration for the traffic rules at the same time. The following steps are relevant to registration of traffic rules by the AF within the 3GPP network.

In some embodiments of step 1, routing information between the AF and the NEF is assumed to be preconfigured. It is also possible to discover the NEF through other means like static information provided as a part of service level agreement between the application provider and 3GPP provider.

In some embodiments of step 2, the AF sends a traffic rules registration to the NEF along with the parameters including an application ID for which the traffic rules apply, an AF address which is processing the application at the AS, an address of single UE, group of UEs or indication that it is applicable to all UEs, traffic rules, type of connection required and potentially other parameters.

In some embodiments of step 3, upon receipt of a traffic rules registration request, the NEF authorizes the AS and make sure that it is allowed to obtain subscribe/notify service, along with the type of events it is allowed to subscribe from the 3GPP network.

In some embodiments of step 4, depending on the operator's local policy, the NEF may store received AF traffic rules as a part of UDM, UDSF or SDSF or forward this message to the PCF or some NF including application specific 3GPP entity supported by the 3GPP network.

In some embodiments of step 5, the NEF sends a response of a traffic rules Registration request to the AF. Note that steps 4 and 5 can occur in any order.

This completes the registration/provisioning part of the AF specific traffic rules in the 3GPP network. Note that this procedure needs to be executed when there is a need to influence AF aware traffic policy in the 3GPP network or when modifications are done in the existing AF application/service information.

All interactions in the present disclosure assumes that AF resides within the application server (AS) is untrusted, i.e. not controlled by the operator and may and/or may not belong to the same PLMN. Trusted AF can directly communicate with the 3GPP NFs. The most probable AF is SMF or PCF for the direct interaction but the AF can be any other NF in the network as well.

Figure 6:
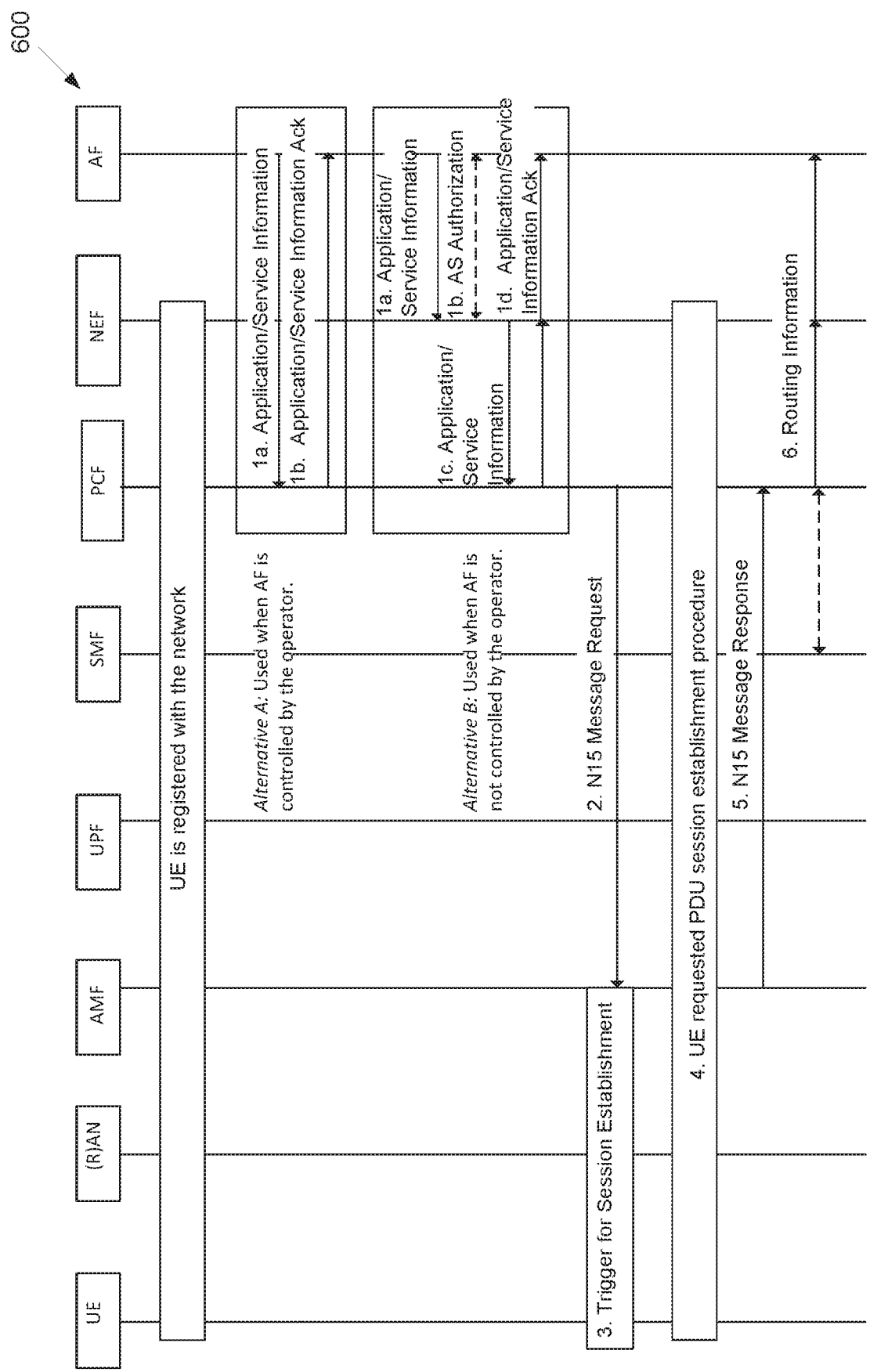
FIG. 6 illustrates an example AF influenced PDU session establishment call flow according to embodiments of the present disclosure.

FIG. 6 illustrates an example AF influenced PDU session establishment call flow 600 according to embodiments of the present disclosure. The embodiment of the AF influenced PDU session establishment call flow 600 illustrated in FIG. 6 is for illustration only. FIG. 6 does not limit the scope of the present disclosure to any particular implementation.

FIG. 6 shows registration of traffic rules for the AF resided within the AS. The AF may decide to subscribe different events (such as user plane information, mobility including UE location) and registration for the traffic rules at the same time.

FIG. 6 defines a call flow involved in establishment of a PDU session based on the service information provided by the application function resides at the application server. The application server may or may not be part of operator's network. If the application server is a part of operator network, any NFs can directly interact with the AF resided at that AS. Otherwise, NF interactions are supported via NEF. Here, provisioning of the AF session information is assumed to be supported by the PCF. Although, as shown in FIG. 5, it could be any NFs within 3GPP network.

This procedure is related to non-roaming scenario and applicable when UE is having an ongoing PDU session with the AF. In case of roaming scenario, the AF may remain part of the home or visited network. Depending on the AF's location, the AF may have different privileges for accesses NF within the corresponding PLMN. The following are steps describing message flow shown in FIG. 6.

In some embodiments of step 1, the AF may provide/revoke service information to the PCF due to AF session signaling. The AF may also subscribe at this point to notification for mobility and/or bearer level events related to the service information. There are multiple alternatives exist based on whether the AF is controlled by the operator. For the PCF to generate the applicable events, the AF instructs the SMF to report bearer level events related to the corresponding PCC rules. Such events are not shown FIG. 6. Normally, mobility events are handled by the AMF. Since SMF is aware of many critical mobility events and also location of UE, the SMF may also serve for providing notification to the AF for mobility events.

In one embodiment of step 1, if the AF is controlled by the operator, alternative A is used where the AF is capable of sending an Application/Service Information directly to the PCF. In another embodiment of step 1, otherwise, if alternative B is used, where the Application/Service Information is sent to the PCF via NEF. When the NEF receives the Application/Service Information from the AF, the NEF first authorizes the AS. Upon successful authorization, the NEF forwards the application/service Information to the PCF. After provisioning, the PCF responds to the AF with an application/service information Ack.

In some embodiments of step 2, since there is no existing PDU session exists to serve this AF, the PCF verifies operator's local policy for initiating new PDU sessions. This can be done by multiple ways such as by sending SMS message, updating UE routing policy or by sending an indicating over an N1 interface to the UE. Based on the operator's configured mechanism, the PCF sends an appropriate N15 message request to an AMF for establishing a new PDU Session. If alternative 2 is used, it is also possible for the NEF to send this message to the SMF directly.

In some embodiments of step 3, based on the information received from the PCF, the AMF initiates an appropriate trigger toward the UE.

In some embodiments of step 4, the UE responds by sending a PDU Session Establishment Request. Steps 1-16 of UE Requested PDU Session Establishment procedure defined in LTE specification are executed for a new PDU session setup.

In some embodiments of step 5, the AMF responds to the PCF by sending an N15 message response.

In some embodiments of step 6, the PCF retrieves user plane routing information from the SMF and provides the user plane routing information to the AF. The UPF routing information is sent via NEF if the NF is not controlled by the operator. Otherwise, the user plane routing information is directly sent to the AF. Alternatively, the PCF may notify routing information to the AF if routing information is subscribed by the AF.

Figure 7:
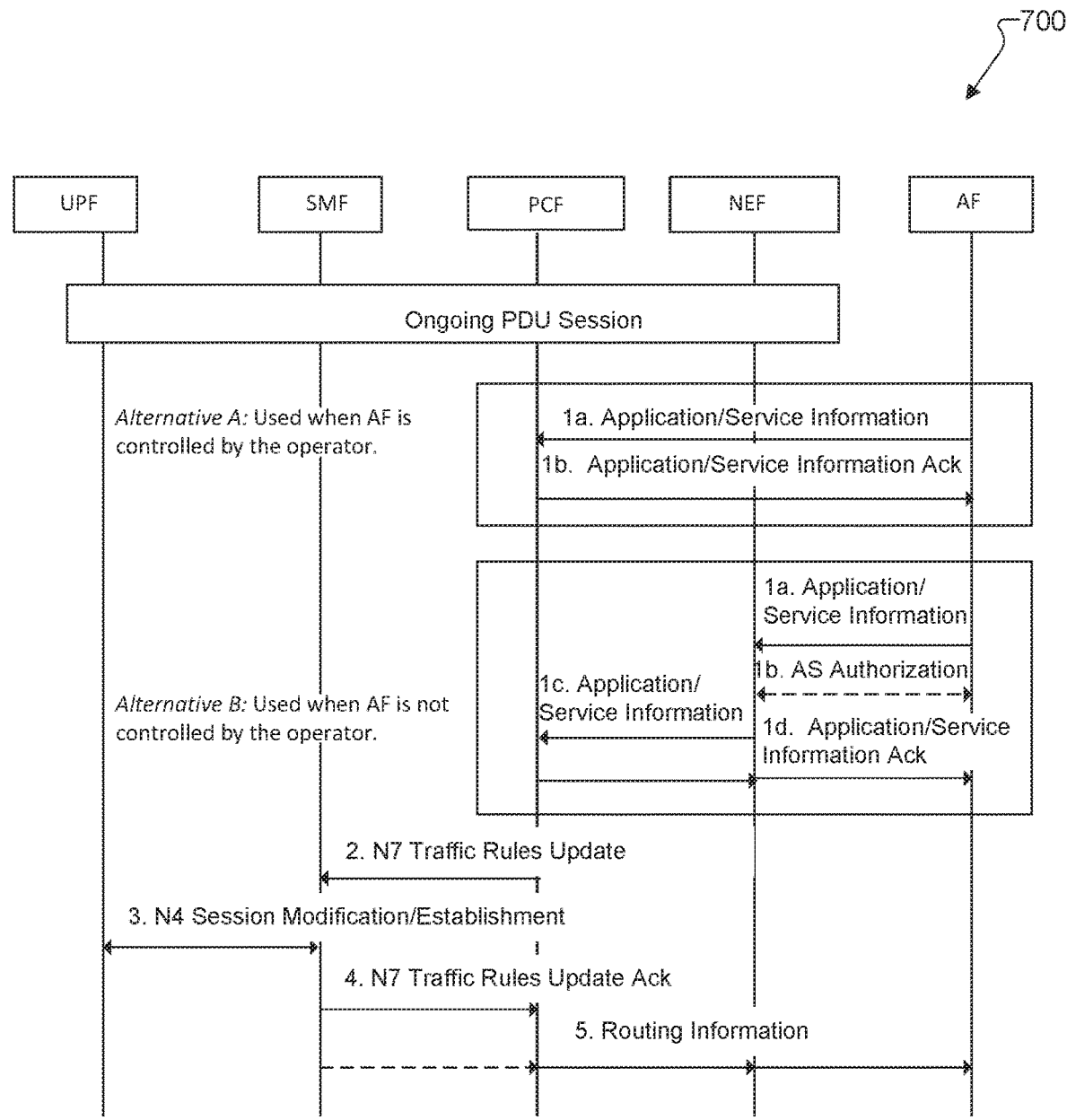
FIG. 7 illustrates an example AF influenced PDU session modification call flow according to embodiments of the present disclosure.

FIG. 7 illustrates an example AF influenced PDU session modification call flow 700 according to embodiments of the present disclosure. The embodiment of the AF influenced PDU session modification call flow 700 illustrated in FIG. 7 is for illustration only. FIG. 7 does not limit the scope of the present disclosure to any particular implementation.

FIG. 7 defines call flow involved in modification of an existing session based on the service information provided by the application function resides at the application server. This application server may or may not be part of operator's network. If the application server is a part of operator network, any NFs can directly interact with the AF resided at that AS. Otherwise, interactions with NFs are supported via NEF. Here, provisioning of the AF session information is assumed to be supported by the PCF. Although, as shown in FIG. 5, the provisioning of the AF session information could be any NFs within 3GPP network. This procedure is related to non-roaming scenario and applicable when a UE is having an ongoing PDU session with the AF. Depending on the UE's location, the UE may have different privileges for accesses NF within the corresponding PLMN.

The following are steps describing message flow shown in FIG. 7.

In some embodiments of step 1, the AF may provide/revoke service information to the PCF due to AF session signaling. The AF may also subscribe at this point to notification for mobility and/or bearer level events related to the service information. There are two alternatives exist based on whether the AF is controlled by the operator. For the PCF to generate the applicable events, the AF instructs the SMF to report bearer level events related to the corresponding PCC rules. Such events are not shown FIG. 7. Normally, mobility events are handled by the AMF. Since SMF is aware of many critical mobility events and also location of UE, the SMF may also serve for providing notification to the AF for mobility events.

In one embodiment, if the AF is controlled by the operator, alternative A is used where the AF is capable of sending an Application/Service Information directly to the PCF.

In another embodiment, otherwise, if alternative B is used, where the application/service Information is sent to the PCF via NEF. When the NEF receives the application/service Information from the AF, the NEF first authorizes the AS. Upon successful authorization, the NEF forwards the application/service Information to the PCF. After provisioning, the PCF responds to the AF with an application/service information Ack.

In some embodiments of step 2, She PCF sends an N7 traffic rules update to the SMF indicating potential update to the AF session. If alternative 2 is used, it is also possible for the NEF to send this message to the SMF directly.

In some embodiments of step 3, based on the information provided by the PCF, the SMF initiates N4 session modification procedure with the existing UPF. If existing UPF cannot support the newly received AF information, the SMF may select a new UPF and initiates an N4 session establishment procedure.

In some embodiments of step 4, the SMF responds to the PCF with an N7 traffic rules update Ack indicating successful allocation of user plane resources. Optionally, the SMF may provide the routing information of the UPF to the PCF in this message.

In some embodiments of step 5, the SMF may sends a separate message to the PCF indicating routing information of the UPF if the separate message is not already sent in step 4. The UPF routing information is then forwarded to the NEF by the PCF if the NF is not controlled by the operator. Otherwise, the UPF routing information is directly sent to the AF. Alternatively, the PCF may notify routing information to the AF if the PCF is subscribed by the AF.

Concept of IMSI and external identity based grouping is part of EPC. Although having a dedicated entity explicitly for managing group within the network is not part of the 4G, i.e. grouping is static and mutually understood by 4G system and external application servers. Due to many different types of services targeted to be supported in 5G, it may be essential to group different user equipments (UEs) based on different criteria. This aspect is new in 5G.

Group Management Support in 5G

Scope of 5G service is very wide in terms of type of services support and different criteria required. With support of application through $3^{rd}$ party application server (which can be trusted or untrusted), it is possible that the application function (AF) may want to apply the policy for all UEs, just one UE or the group of the UE. It currently not decided on how grouping can be formed since the purpose of grouping may be different for different applications. The present disclosure provides a mechanism of forming a group as a part of the 3GPP network based on the criteria provided by the application/network function which can be controlled by the operator or outside of operator control, having appropriate verification and different level of security apply to them.

In some embodiments, conveying application criteria and group type information by the application function (resided at the Application Server which may or may not be controlled by the 5G system operator) to the 5G system is considered. For requesting the new group, mandatory parameters includes identity of the application function (AF) and group type along with other optional parameters depending on the type of the application(s) for which this group is requested. While for updating or deleting the group, it is mandatory to provide AF identity and the group number.

The logical function called group management function (GMF) is responsible for the management of the group. The GMF verifies the received information from the AF and then forms a new group if the request is to create a new group, otherwise the GMF may either perform the update or deletion of the group depending on the request from the AF. This GMF may be defined as a standalone function in 5G or the GMF may be collocated with other network function (NF) within 5G system such as unified data management (UDM) system which manages subscribers profile), policy control function (PCF).

The GMF may be directly communicating with the AF if the AF is the trusted entity (controlled by the same operator) or the GMF may communicate via the 5G NF called network exposure function (NEF). The NEF or AF (in case of trusted AF) may obtain information of the GMF from the network repository function (NRF) or the address of the GMF may be configurable.

5G system conveys a unique group number to the AF after group creation request. If the request is to update or delete the group, only the status code of the request processing may be returned to the AF.

An AF making use of previously obtained group number(s) from the 5G system for requesting new services is applicable to this predefined set of groups (which are formed based on certain criteria). These groups can also be used for updating existing PDU sessions or policy/features relevant to certain UEs.

In some embodiments, a new logical function GMF which may be defined as stand-alone or the new logical function GMF may be a part of (co-located with) another NF within 5G such as UDM, PCF. In one example, GMF communicates directly with the AF (in case of operator controlled AF) or the GMF may communicate via NEF. In another example, information of the GMF may be pre-configured at the NEF/AF or the information of the GMF may be obtained from the NRF.

In some embodiments, an AF which is resided at the application server (AS) sends a new request to NEF/GMF along with AF identity and group type.

In some embodiments, GMF performs verification of the AS and creates a new group number.

In some embodiments, GMF provides new group number to the AF for future reference to that particular group.

In some embodiments, an AF sends request to update the group member information or group criteria or request to delete the group.

In some embodiments, GMF performs an appropriate processing based on the request and sends a result code to the AF.

In some embodiments, GMF informs relevant entities on the updates provided by the AF (in case of ongoing use of the group). The GMF may inform about each group member separately or the GMF may provide list of the members to the communicating network entity(ies).

In some embodiments, GMF verifying group criteria when AF initiates a request which includes one or more of these groups.

In some embodiments, the aforementioned embodiments including functionality of managing group may also be requested by other network entities internal to the 5G system.

Figure 8:
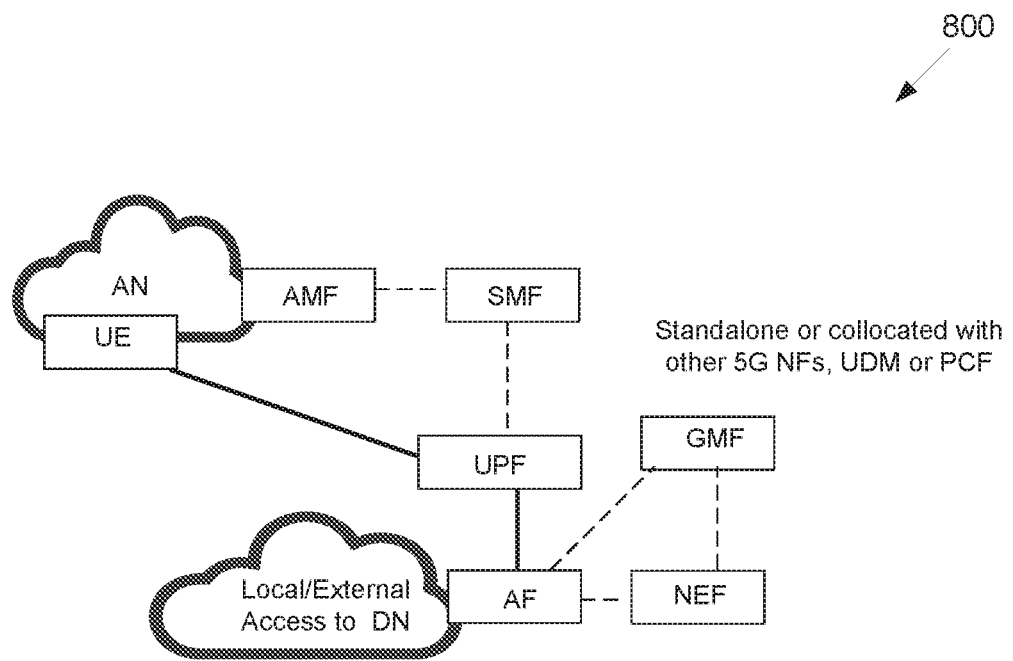
FIG. 8 illustrates an example GMF interaction with trusted/untrusted AF according to embodiments of the present disclosure.

FIG. 8 illustrates an example GMF interaction with trusted/untrusted AF 800 according to embodiments of the present disclosure. The embodiment of the GMF interaction with trusted/untrusted AF 800 illustrated in FIG. 8 is for illustration only. FIG. 8 does not limit the scope of the present disclosure to any particular implementation.

FIG. 8 shows a new logical function called group management function (GMF) in the 5G architecture. This entity can be stand-alone in the 5G system or the GMF can co-exist with other network functions or unified directory management (entity which manages subscription information) or the policy control function (PCF). The main task of this entity is to create, update or delete the group requested internally by any network functions or by the application function which may or may not be trusted. According to the 5G terminology, if the AF is controlled by the operator, the AF is treated as a trusted entity. Otherwise, the AF is treated as untrusted entity. If the AF is trusted, the AF can directly communicate with any AF in 5G system. Otherwise, the interaction with the AF needs to be via NEF which is shown in FIG. 8.

The information regarding AF, GMF and/or NEF may be pre-configured or the NEF or AF may need to communicate to the network routing function (NRF) for identifying correct GMF which can provide group management functionality. The choice may be up to operator's local policy.

In some embodiments of a first option, the first option assumes that the AF resides within the application server (AS) is untrusted, i.e. not controlled by the operator and may and/or may not belong to the same PLMN. The most probable NF is SMF or PCF for the direct interaction but the NF can be any other NF in the network as well. While the second option assumed that the AF is under the control of the operator and hence able to directly communicate with an NF of the 5G system.

Figure 9:
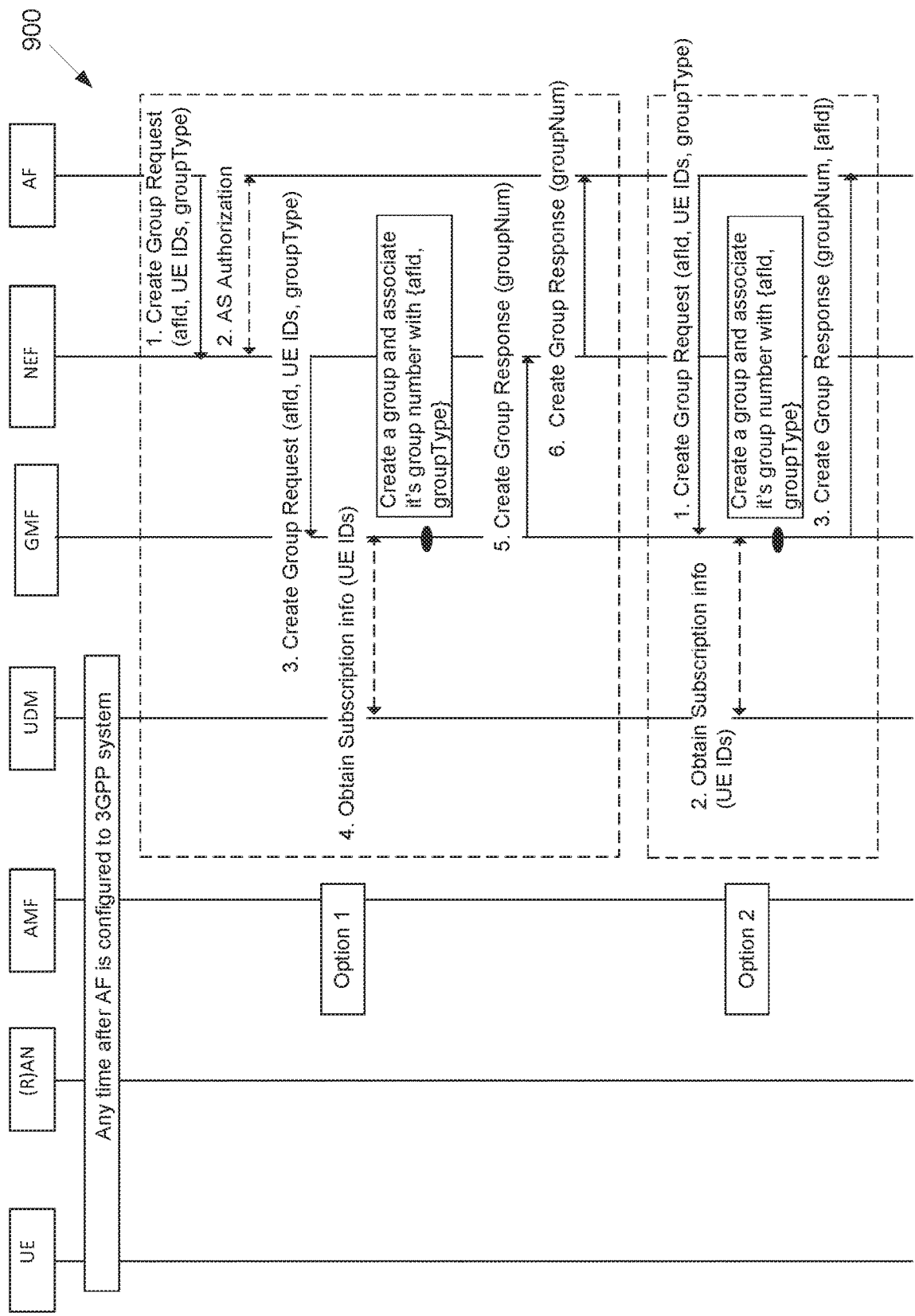
FIG. 9 illustrates an example call flow for a new group request according to embodiments of the present disclosure.

FIG. 9 illustrates an example call flow 900 for a new group request according to embodiments of the present disclosure. The embodiment of the call flow 900 illustrated in FIG. 9 is for illustration only. FIG. 9 does not limit the scope of the present disclosure to any particular implementation.

FIG. 9 is relevant when the AF or any other internal network entity decides to form a group of UEs based on certain criteria such as location, device type, service access type etc.

The following steps are relevant to creation of a group from the untrusted AF resided at an application server or from any other external entity resided outside of the 5G network. Routing information between the AF and the NEF is assumed to be preconfigured. It is also possible to discover the NEF through other means like static information provided as a part of service level agreement between the application provider and 5G provider.

In some embodiments of step 1, the AF sends a create group request to the NEF along with the parameters including application function identity, type of the group, list of UEs to be part of this group, other conditions/criteria based on which the AF requests the GMF to identify the list of UEs, criteria and other conditions applicable for the management of this group.

In some embodiments of step 2, upon receipt of the create group request, the NEF optionally authorizes the AS and make sure that it is allowed to manage 5G groups. The decision to authorize certain AS may be based on the operator's local policy.

In some embodiments of step 3, the NEF forwards the Create Group Request message to the GMF.

In some embodiments of step 4, upon receipt of this request, the GMF checks whether similar group already exist (for duplication) and obtain list of UEs to be included in the group based on the criteria/rules provided by the AF (if UE list is not directly provided by the AF). Even if the list is provided by the AF, the GMF may need to perform or request mapping of external identities to internal identities from the NEF or by some other means. For the information on the subscriptions for the UEs in the list, the UE may need to communicate with the UDM. The subscription record of the UE may need to enhance to recognize the membership of the new group.

In some embodiments of step 5, once all conditions are satisfied, the UE creates a new group and provides the identity of that group in the return response to the NEF.

In some embodiments of step 6, the NEF forwards the response to the requesting AF.

The following steps are relevant to creation of a group from the trusted AF resided at an application server or from any other internal entity of the 5G network. Routing information between the AF and the GMF is assumed to be pre-configured. It is also possible to discover the GMF through other means like static information provided as a part of service level agreement between the application provider and 5G provider or requesting the NRF to provide the information of the GMF.

In some embodiments of step 1, the AF sends a create group request to the GMF along with the parameters including application function identity, type of the group, list of UEs to be part of this group, other conditions/criteria based on which the AF requests the GMF to identify the list of UEs, criteria and other conditions applicable for the management of this group.

In some embodiments of step 2, upon receipt of this request, the GMF checks whether similar group already exist (for duplication) and obtain list of UEs to be included in the group based on the criteria/rules provided by the AF (if UE list is not directly provided by the AF). Even if the list is provided by the AF, the GMF may need to perform or request mapping of external identities to internal identities from the NEF or by some other means. For the information on the subscriptions for the UEs in the list, the UE may need to communicate with the UDM.

In some embodiments of step 3, once all conditions are satisfied, the UE creates a new group and provides the identity of that group in the return response to the AF.

Figure 10:
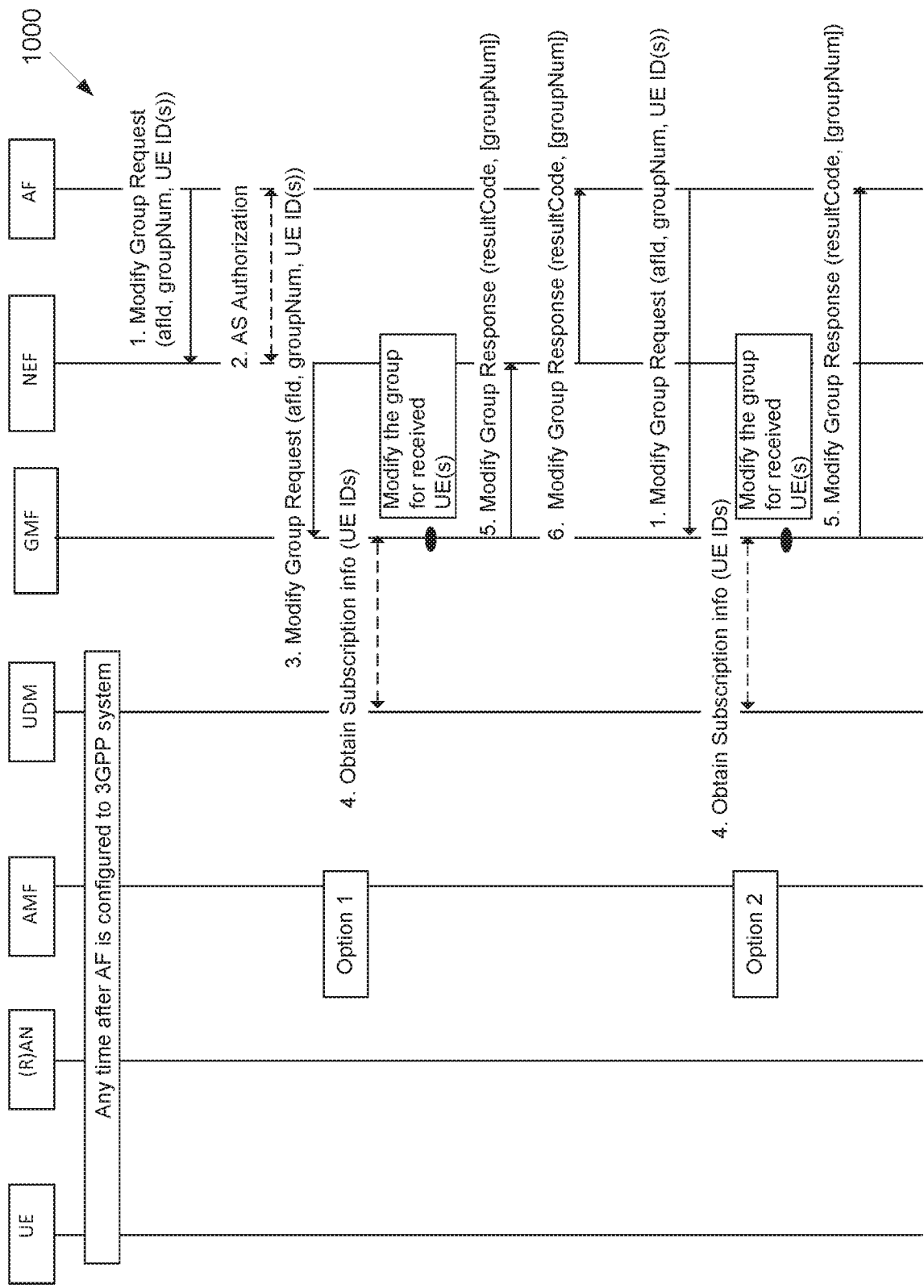
FIG. 10 illustrates an example call flow for a group/group member(s) modification according to embodiments of the present disclosure.

FIG. 10 illustrates an example call flow for 1000 a group/group member(s) modification according to embodiments of the present disclosure. The embodiment of the call flow for 1000 illustrated in FIG. 10 is for illustration only. FIG. 10 does not limit the scope of the present disclosure to any particular implementation.

The call flow shown in FIG. 10 is relevant when the AF or any other internal network entity decides to update the existing group of UEs or updates to the criteria applicable to all these UEs.

The following steps are relevant to modification of a group from the untrusted AF resided at an application server or from any other external entity resided outside of the 5G network. Routing information between the AF and the NEF is assumed to be preconfigured. It is also possible to discover the NEF through other means like static information provided as a part of service level agreement between the application provider and 5G provider.

In some embodiments of step 1, the AF sends a modify group request to the NEF along with the parameters including application function identity, group number/identity provided by the GMF earlier. In addition to these parameters, the AF may also provide a new list of the UEs and/or updated criteria impacting all new or existing UEs in the list.

In some embodiments of step 2, upon receipt of the modify group request, the NEF optionally authorizes the AS and make sure that it is allowed to modify the 5G groups. The decision to authorize certain AS may be based on the operator's local policy.

In some embodiments of step 3, the NEF forwards the modify group request message to the GMF.

In some embodiments of step 4, upon receipt of this request, the GMF checks whether the requested group already exist (or created earlier). The GMF may need to perform or request mapping of external identities to internal identities from the NEF or by some other means for the UEs requested in the request from the AF. For the information on the subscriptions of the UEs in the list, the UE may need to communicate with the UDM. The subscription record of the UE may need to be enhanced based on whether the UE is newly added or removed from the original list of the UEs.

In some embodiments of step 5, once all conditions are satisfied, the UE modifies the group and provides the result code in the return response to the NEF. It may need to communicate with other NFs in the 5G system to convey appropriate changes if those changes are subscribed by those NFs.

In some embodiments of step 6, the NEF forwards the response to the requesting AF.

The following steps are relevant to modification of a group from the trusted AF resided at an application server or from any other internal entity of the 5G network. Routing information between the AF and the GMF is assumed to be pre-configured. It is also possible to discover the GMF through other means like static information provided as a part of service level agreement between the application provider and 5G provider or requesting the NRF to provide the information of the GMF.

In some embodiments of step 1, the AF sends a modify group request to the NEF along with the parameters including application function identity, group number/identity provided by the GMF earlier. In addition to these parameters, the AF may also provide a new list of the UEs and/or updated criteria impacting all new or existing UEs in the list.

In some embodiments of step 4, upon receipt of this request, the GMF checks whether the requested group already exist (or created earlier). The GMF may need to perform or request mapping of external identities to internal identities from the NEF or by some other means for the UEs requested in the request from the AF. For the information on the subscriptions of the UEs in the list, the UE may need to communicate with the UDM. The subscription record of the UE may need to be enhanced based on whether the UE is newly added or removed from the original list of the UEs.

In some embodiments of step 5, once all conditions are satisfied, the UE modifies the group and provides the result code in the return response to the AF. It may need to communicate with other NFs in the 5G system to convey appropriate changes if those changes are subscribed by those NFs.

Figure 11:
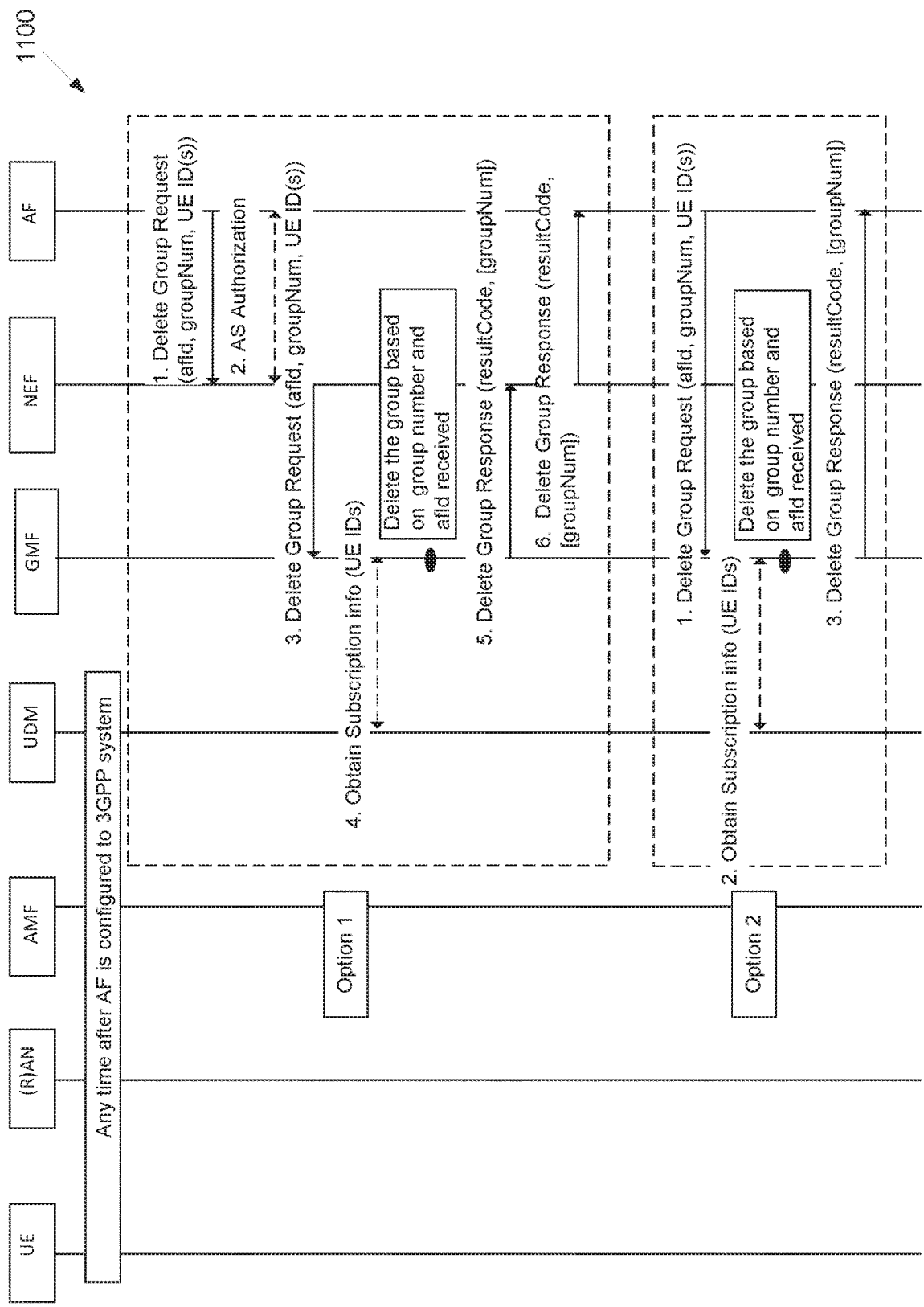
FIG. 11 illustrates an example call flow for a group deletion according to embodiments of the present disclosure.

FIG. 11 illustrates an example call flow 1100 for a group deletion according to embodiments of the present disclosure. The embodiment of the call flow 1100 illustrated in FIG. 11 is for illustration only. FIG. 11 does not limit the scope of the present disclosure to any particular implementation.

The call flow shown in FIG. 11 is relevant when the AF or any other internal network entity decides to delete the existing group.

The following steps are relevant to deletion of a group from the untrusted AF resided at an application server or from any other external entity resided outside of the 5G network. Routing information between the AF and the NEF is assumed to be pre-configured. It is also possible to discover the NEF through other means like static information provided as a part of service level agreement between the application provider and 5G provider.

In some embodiments of step 1, the AF sends a delete group request to the NEF along with the parameters including application function identity, and group number/identity provided by the GMF earlier.

In some embodiments of step 2, upon receipt of the delete group request, the NEF optionally authorizes the AS and make sure that it is allowed to delete the 5G groups. The decision to authorize certain AS may be based on the operator's local policy.

In some embodiments of step 3, the NEF forwards the delete group request message to the GMF.

In some embodiments of step 4, upon receipt of this request, the GMF checks whether the requested group already exist (or created earlier). If necessary, the GMF may communicate with the UDM to update subscription records of the UEs which are members of the group which is being deleted.

In some embodiments of step 5, once all conditions are satisfied, the GMF deletes the group and provide the result code in the returned response to the NEF. The GMF may need to communicate with other NFs in the 5G system to convey appropriate changes if those changes are subscribed by those NFs.

In some embodiments of step 6, the NEF forwards the response to the requesting AF.

The following steps are relevant to modification of a group from the trusted AF resided at an application server or from any other internal entity of the 5G network. Routing information between the AF and the GMF is assumed to be pre-configured. It is also possible to discover the GMF through other means like static information provided as a part of service level agreement between the application provider and 5G provider or requesting the NRF to provide the information of the GMF.

In some embodiments of step 1, the AF sends a delete group request to the NEF along with the parameters including application function identity, and group number/identity provided by the GMF earlier.

In some embodiments of step 2, upon receipt of this request, the GMF checks whether the requested group already exist (or created earlier). If necessary, the GMF may communicate with the UDM to update subscription records of the UEs which are members of the group which is being deleted.

In some embodiments of step 3, once all conditions are satisfied, the GMF deletes the group and provides the result code in the returned response to the AF. The GMF may need to communicate with other NFs in the 5G system to convey appropriate changes if those changes are subscribed by those NFs.

Selection of Policy Control Functions in 5G

The present disclosure provides multiple embodiments for accessing policy control function to be used for policy management in the 5G network. In 5G, there may be a farm of policy control functions which may be managing different set of users and user subscriptions. For certain interactions involving group of users (UEs) requiring access to PCFs directly from the internal or external entities, it is essential to know which PCF can be used. Generally, the PCF is identified based on the data network name (DNN) and single network slice selection assistance information (S-NSSI). The main issue is that this PCF needs to be persistent so that the same PCF can provide information throughout the life of the PDU session and also contacting them when the group of UEs are involving, serve by different PCFs.

The present disclosure provides multiple embodiments for contacting PCFs when the group of UEs are involved which are served by different PCFs:

In some embodiments, default PCF is selected for communicating with the internal and/or external entity. Every time, group of UEs are involved, this PCF is contacted. This PCF then forwards the request to appropriate list of PCFs based on certain criteria such as requested DNN and S-NSSAI. This is the PCF which is responsible for aggregating all PCF responses and communicating with the external/internal entity.

In some embodiments, the NEF identifies all relevant PCFs based on certain criteria and sends individual requests to them. The NEF is responsible for aggregating all PCF responses and communicating with the external/internal entity. One of the criteria could be that all PCFs which serve requested DNN and S-NSSAI get selected.

In some embodiments, the UDM may also store information of the serving PCF. Hence, alternatively, the NEF communicates with the UDM and obtain corresponding PCFs. The SMF may also able to access PCF from the UDM for an individual UE.

In some embodiments, the following functions are considered: configuration of default/virtual PCF which is used for communicating with the internal and/or external entity. Every time, group of UEs are involved, this PCF is contacted. Since the PCF is virtual, the internal communication is hidden from the external entity; forwarding of the received request by the PCF to appropriate list of PCFs based on certain criteria such as requested DNN and S-NSSAI; aggregation of all PCF responses by the default PCF and communicating with the external/internal entity; the NEF identifies all relevant PCFs based on certain criteria (such as requested DNN and S-NSSA); the NEF sends individual requests to relevant PCFs; the NEF is responsible for aggregating all PCF responses and communicating with the external/internal entity; storing of serving PCF information as a part of UDM subscription when the PDU session is established; retrieving PCF information from the UDM by the NEF or by an SMF at the time of PDU session management request (establishment, modification or release); and The NEF communicates with the UDM and obtain corresponding PCFs. In absence of PCF information in the UDM, the NEF may communicate with the NRF to provide the PCF information.

Figure 12:
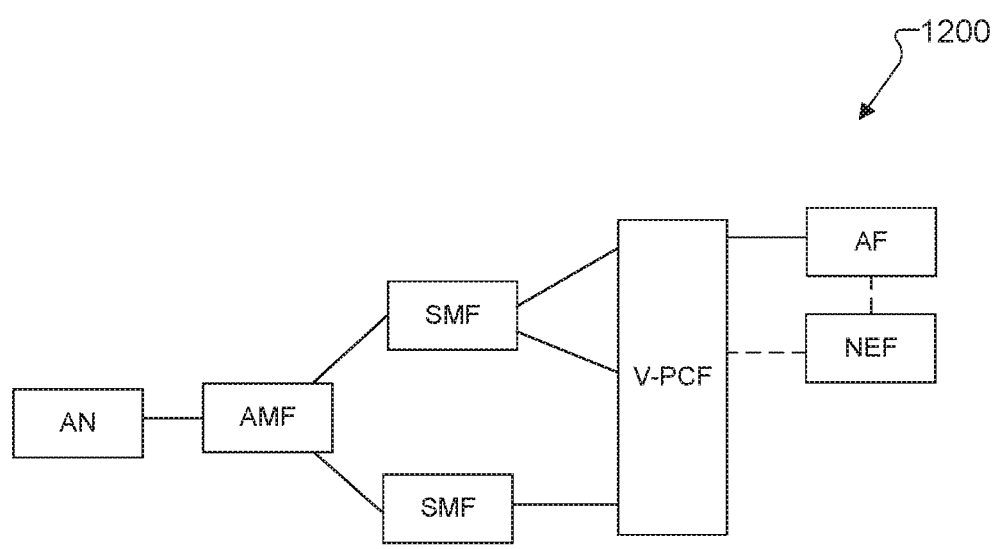
FIG. 12 illustrates an example use of default/virtual PCF according to embodiments of the present disclosure.

FIG. 12 illustrates an example use of default/virtual PCF 1200 according to embodiments of the present disclosure. The embodiment of the use of default/virtual PCF 1200 illustrated in FIG. 12 is for illustration only. FIG. 12 does not limit the scope of the present disclosure to any particular implementation.

FIG. 12 shows use of default/virtual PCF which is selected for communicating with the internal and/or external entity. Every time, group of UEs are involved, the pre-configured address of the PCF is used to contact the PCF. This PCF then forwards the request to appropriate list of PCFs based on certain criteria such as requested DNN and S-NSSAI. This is the PCF which is responsible for aggregating all PCF responses and communicating with the external/internal entity.

Figure 13:
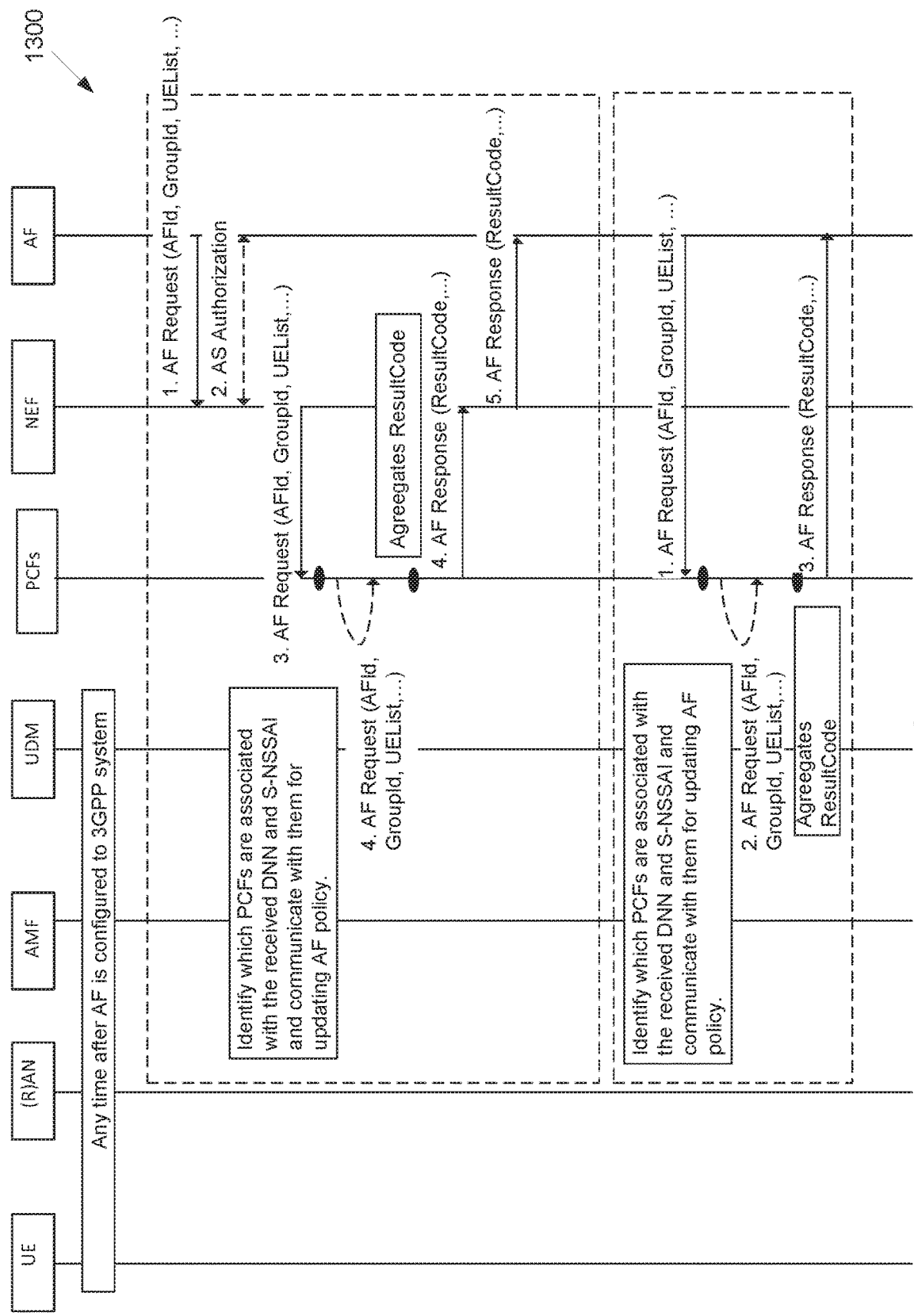
FIG. 13 illustrates an example call flow when default/virtual PCF is used according to embodiments of the present disclosure.

FIG. 13 illustrates an example call flow 1300 when default/virtual PCF is used according to embodiments of the present disclosure. The embodiment of the call flow 1300 illustrated in FIG. 13 is for illustration only. FIG. 13 does not limit the scope of the present disclosure to any particular implementation.

FIG. 13 shows the call flow depicting interactions of the trusted/untrusted AF and the default/virtual PCF when the AF is requesting policy relevant to group of UEs.

The following steps are relevant to creation of a group from the untrusted AF resided at an application server or from any other external entity resided outside of the 5G network. Routing information between the AF and the NEF is assumed to be preconfigured. It is also possible to discover the NEF through other means like static information provided as a part of service level agreement between the application provider and 5G provider.

In some embodiments of step 1, the AF sends an AF Request to the NEF along with the parameters including application function identity, group number or list of UEs along with other relevant parameters.

In some embodiments of step 2, upon receipt of the AF Request, the NEF optionally authorizes the AS and make sure that it is allowed to manage 5G groups. The decision to authorize certain AS may be based on the operator's local policy.

In some embodiments of step 3, the NEF forwards the AF Request message to the default/virtual PCF which was preconfigured at the NEF earlier.

In some embodiments of step 4, upon receipt of this request, the default/virtual PCF identifies criteria for which the group was formed. For example, if the list of the UEs received in the request is based on the DNN and S-NSSAI, the default/virtual PCF may select all PCFs serve these parameters. The selection of the PCF may be implementation specific or the selection of the PCF may also be pre-determined. The default/virtual PCF then forwards the received AF Request to these PCFs individually. If then aggregates result codes from the responses received from these PCFs and sends the response to the NEF.

In some embodiments of step 5, the NEF forwards the response to the requesting AF.

The following steps are relevant to creation of a group from the trusted AF resided at an application server or from any other internal entity of the 5G network. Routing information between the AF and the GMF is assumed to be pre-configured. It is also possible to discover the GMF through other means like static information provided as a part of service level agreement between the application provider and 5G provider or requesting the NRF to provide the information of the GMF.

In some embodiments of step 1, the AF sends an AF Request to the default/virtual PCF along with the parameters including application function identity, group number or list of UEs along with other relevant parameters.

In some embodiments of step 2, upon receipt of this request, the default/virtual PCF identifies criteria for which the group was formed. For example, if the list of the UEs received in the request is based on the DNN and S-NSSAI, the default/virtual PCF may select all PCFs serves these parameters. The default/virtual PCF then forwards the received AF request to these PCFs individually. If then aggregates result codes from the responses received from these PCFs.

In some embodiments of step 3, the default/virtual PCF then forwards the response to the requesting AF.

Figure 14:
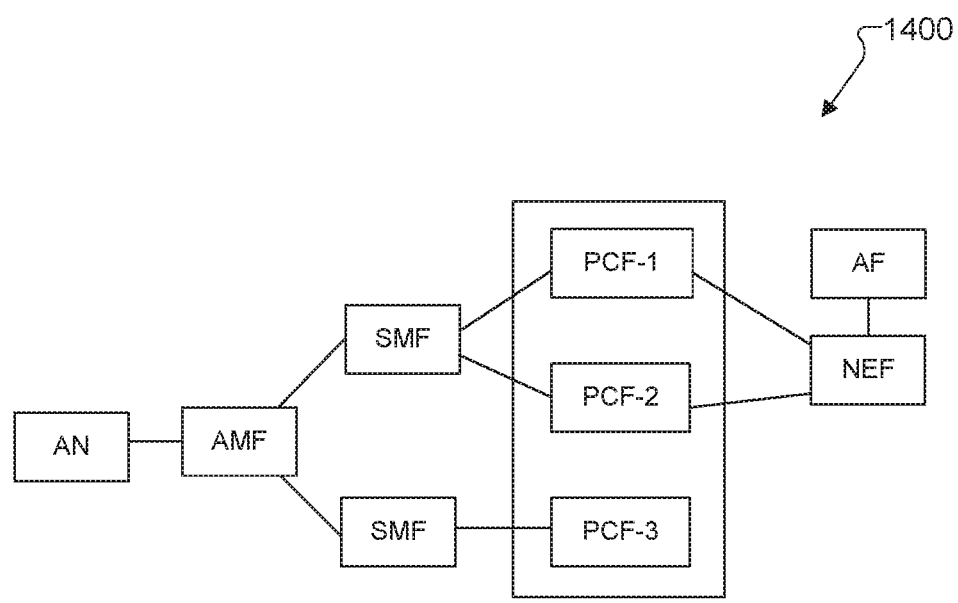
FIG. 14 illustrates an example determination of PCFs by NEF according to embodiments of the present disclosure.

FIG. 14 illustrates an example determination of PCFs by NEF 1400 according to embodiments of the present disclosure. The embodiment of the determination of PCFs by NEF 1400 illustrated in FIG. 14 is for illustration only. FIG. 14 does not limit the scope of the present disclosure to any particular implementation.

FIG. 14 shows the call flow depicting interactions of the trusted/untrusted AF and the NEF when the AF is requesting policy relevant to group of UEs As shown in FIG. 14, the NEF identifies all relevant PCFs based on certain criteria and sends individual requests to them. The NEF is responsible for aggregating all PCF responses and communicating with the external/internal entity. One of the criteria could be that all PCFs which serve requested DNN and S-NSSAI get selected.

Figure 15:
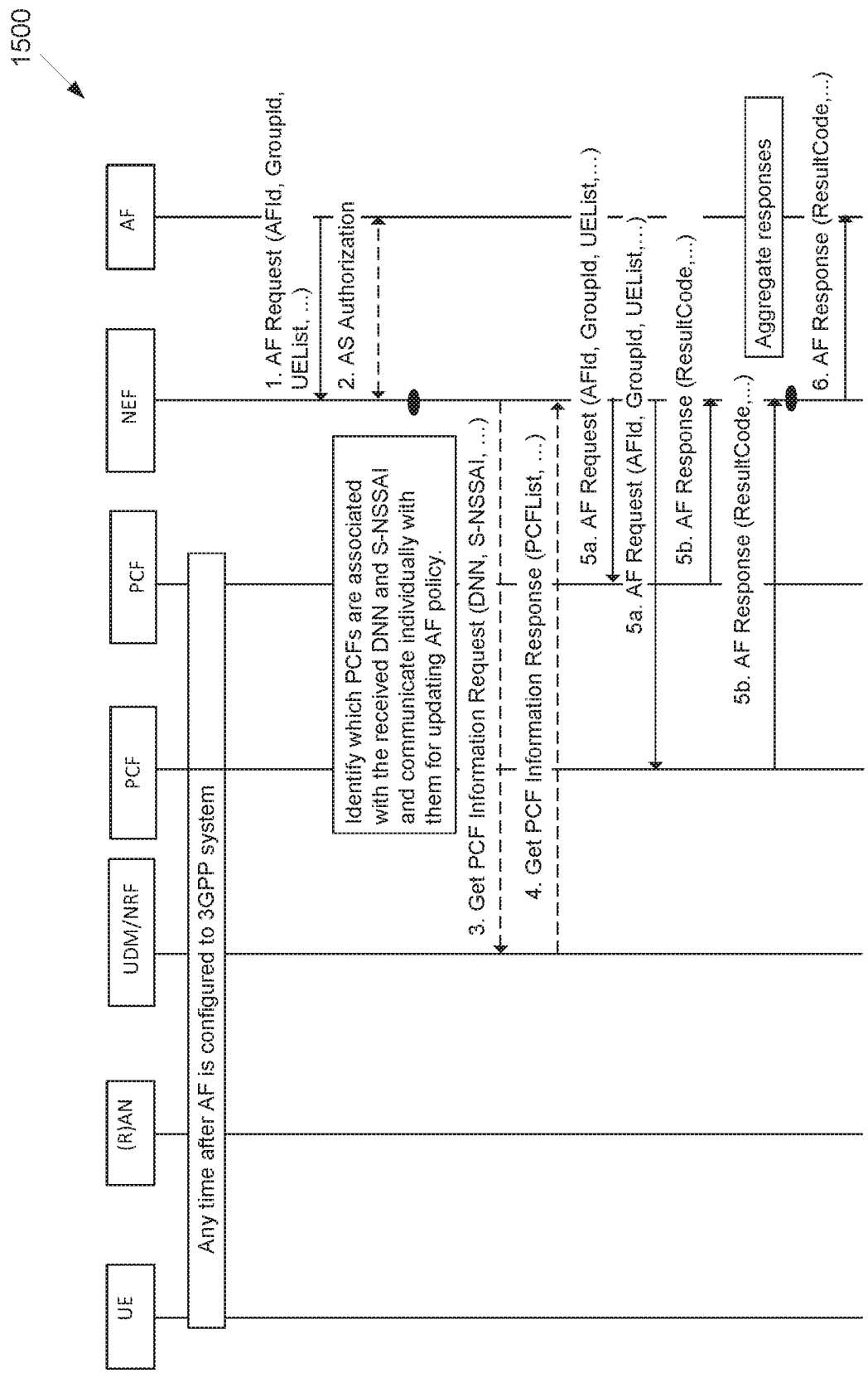
FIG. 15 illustrates an example call flow when the NEF determines PCFs according to embodiments of the present disclosure.

FIG. 15 illustrates an example call flow 1500 when the NEF determines PCFs according to embodiments of the present disclosure. The embodiment of the call flow 1500 illustrated in FIG. 15 is for illustration only. FIG. 15 does not limit the scope of the present disclosure to any particular implementation.

FIG. 15 shows the call flow depicting interactions of the AF and the NEF when the AF is requesting policy relevant to group of UEs. Routing information between the AF and the NEF is assumed to be preconfigured. It is also possible to discover the NEF through other means like static information provided as a part of service level agreement between the application provider and 5G provider.

In some embodiments of step 1, the AF sends an AF request to the NEF along with the parameters including application function identity, group number or list of UEs along with other relevant parameters.

In some embodiments of step 2, upon receipt of the AF Request, the NEF optionally authorizes the AS and make sure that it is allowed to manage 5G groups. The decision to authorize certain AS may be based on the operator's local policy.

In some embodiments of step 3, the NEF may try to obtain the information of the PCF from the UDM or NRF or the NEF can execute the logic locally to determine the set of PCFs that needs to be informed regarding this request. This request may be sent per UE, per UE list or based on some other criteria which can determine the target group of the UE (such as requested DNN and S-NSSAI).

In some embodiments of step 4, depend in how requests were sent to UDM/NRF, corresponding responses are received (aggregated or single). At this point, the NEF obtain the list of PCFs which are relevant.

In some embodiments of step 5, the NEF forwards the received request from the AF to each of these PCFs individually and what for their response. Once the response is received, the NEF aggregates those responses.

In some embodiments of step 6, the NEF then forwards the aggregated response to the AF.

Next generation wireless standards (3GPP SA2) started working on the architecture standards. The intent of the disclosure is to provide roaming implication of the UE based on the location of the application function (AF) which can be in the home PLMN or in the visited PLMN.

Roaming Support for AF-Influenced Traffic Steering

The present disclosure provides details on the procedures involved for the UE which is roaming in the visited network based on the location of the AF which could be either in the home network or in the visited network. The present disclosure provides solution for the roaming when the UE is roaming, having ongoing PDP session, and the AF makes updates to the AF's policy, potentially impacting existing user plane. If there is no ongoing PDU sessions for that UE, future PDU session may use information provided by the AF. In that case, as a part of session establishment procedure, the PDU-CAN request may obtain this information There are four options involved based on the location of the AF when UE is roaming: local breakout roaming scenario: AF is in visited network; local breakout roaming scenario: AF is in home network; home routed roaming scenario: AF is in visited network; and home routed roaming scenario: AF is in home network.

In some embodiments, option 1 is treated same as non-roaming case which is currently discussed in LTE specification while option 3 is not applicable since for home routed scenarios, all services (except emergency services) are supported in the home network. If the AF is in the visited network, all messaging needs to be traversed to the home network which adds lot of signaling overhead. Current architecture in LTE specification also does not have this option as a possible architecture option. Hence the present disclosure covers only option 2 and 4.

In some embodiment of option 2, services are locally handled in the visited network although the AF is resided in the home network. In this case, it is essential that the request from the AF is sent to the visited network once it is determined that the UE is roaming and there is an ongoing PDU session with local breakout is supported for that PDU session. In this case, interactions between two PCFs are assumed to notify the SMF in the visited network to act on the updates requested by the AF.

In some embodiments of option 4, services are locally handled in the home network and the AF is also resided in the home network. In this case, two options exist by which the home network informs visited network to update corresponding user plane, a). H-PCF communicates to the V-PCF (with two flavors) or b) H-SMF communicates with the V-SMF. Both these options are provided as a part of the present disclosure.

In some embodiments, the following is a set of new features added: determination at the Home PCF that the UE is roaming and currently having a PDU session; communication with the V-PCF over N24 interface for exchanging AF traffic steering request/response In some embodiments of option 2—alternative A, the following is a set of new features added: waiting for UP update completed message from the SMF at the V-PCF prior to responding to H-PCF; and notification sent by the H-PCF indicating occurring of UP management event In some embodiments of option 2—alternative B, the following is a set of new features added: the V-PCF responds to H-PCF once the V-PCF receives traffic steering request; the V-SMF responds to V-PCF with PDU-CAN modification response once the V-SMF receives a PDU-CAN modification request from the V-PCF; and once user plane updates are confirmed, (1) V-SMF notifies the H-NEF via V-NRF which then directly communicates with the H-NRF or directly, (2) V-SMF notifies the H-NEF via V-NEF which then directly communicates with the H-NRF, H-NEF or directly, and (3) V-SMF notifies the H-NEF via V-PCF which then communicates with H-PCF. The H-PCF then forwards the notification to the H-NEF; and the H-NEF sends received notification to the AF in home network.

In some embodiments of option 4—alternative A, the following is a set of new features added: H-PCF sends PDU-CAN modification request to the H-SMF; H-SMF initiates user plane update if it is necessary and also informs potential user plane update to the V-SMF by sending 9. PDU-CAN modification request; the V-SMF initiates potential user plane update with the UPF and also triggers updates toward the UE if necessary; V-SMF responds to the H-SMF with PDU-CAN modification response; H-SMF sends UP management event notification to the H-NEF which then forwards to the AF. The H-SMF may also send the notification directly.

In some embodiments of option 4—alternative B, the following is a set of new features added: H-PCF sends an AF Traffic Steering Request to the V-PCF; V-PCF then sends a PDU-CAN modification request to the V-SMF. The V-SMF request the UPF and also to the UE for potential updates to the existing user plane; once user plane updates are completed, the V-SMF responds with the PDU-CAN modification response to the V-PCF which then sends an AF traffic steering response to the H-PCF; the H-PCF also informs the H-SMF to update AF policy by sending a PDU-CAN modification request; and once potential modification to the user plane is completed in the home network, the H-SMF notifies UP management event to the AF either directly or via the V-NEF.

In some embodiments of option 4—alternative C, the following is a set of new features added: H-PCF sends an AF traffic steering request to the V-PCF and the V-PCF responds with the AF traffic steering response; starting of timer update to monitor UP update confirmation from the V-SMF (after step 11); the V-PCF then sends a PDU-CAN modification request to the V-SMF which responds with the PDU-CAN modification response to the V-PCF (e.g., there may be multiple SMFs serving multiple PDU sessions for the same UE); the V-SMF updates the user plane if necessary and the V-SMF also instructs the AN/UE to update the user plane as well in this case; to step 19, the H-PCF also sends PDU-CAN modification request to the H-SMF which responds with the PDU-CAN modification response to the H-PCF and there may be multiple SMFs serving multiple PDU sessions for the same UE; the H-SMF updates the user plane if necessary; and once updates are completed, the V-SMF informs H-SMF regarding the successful completion by sending UP update notification request and the H-SMF responds to the V-SMF and notifies UP management event to the AF either directly or via the V-NEF.

Based on the 5G architecture, for supporting trusted and non-trusted AFs, there are four options possible based on the location of the AF and type of roaming scenarios supported by the network. Determination on the type of roaming is based on service level agreement and other pre-configuration of the roaming networks identified ahead of time between different networks. The four options identified above are possible scenarios.

In some embodiments of option 2—Local breakout roaming scenario where AF is in home network, services are locally handled in the visited network although the AF is resided in the home network. In this case, it is essential that the request from the AF is sent to the visited network once it is determined that the UE is roaming and there is an ongoing PDU session with local breakout is supported for that PDU session. In this case, interactions between two PCFs are assumed to notify the SMF in the visited network to act on the updates requested by the AF.

Note that in this scenario, the SMF in the visited network may handle all services and there may not be SMF in the home network. There are two alternatives exist based on how notification may be sent back to the AF.

Figure 16:
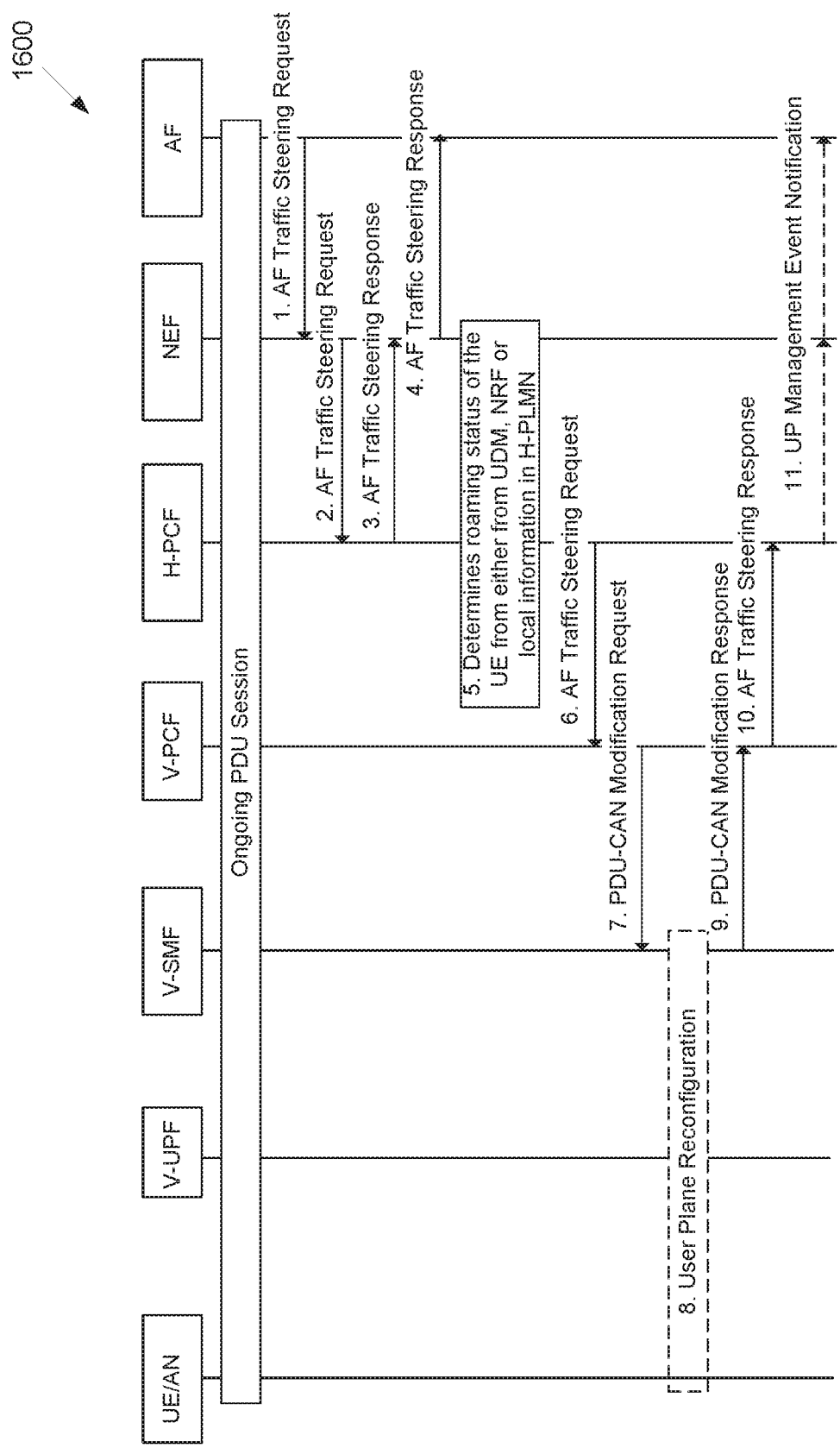
FIG. 16 illustrates an example option 2A—notification via PCF according to embodiments of the present disclosure.

FIG. 16 illustrates an example option 2A 1600—notification via PCF according to embodiments of the present disclosure. The embodiment of the option 2A 1600 illustrated in FIG. 16 is for illustration only. FIG. 16 does not limit the scope of the present disclosure to any particular implementation.

In some embodiments of step 1, the AF creates an AF traffic steering request with the content currently identified in LTE specification. This request also includes list of user plane management events AF likes to subscribe. Depending on the type of deployment options (whether AF is trusted or untrusted), the request is sent directly to the PCF (in case of trusted) or the request traverses via the NEF (in case of untrusted). The call flow shows untrusted AF interaction but the trusted AF interaction is not precluded.

In some embodiments of step 2, upon receipt of the AF traffic steering request from the AF, the NEF maps corresponding attributes as mentioned in LTE specification and then forwards to the PCF. In the direct interaction to the PCF, the AF is expected to provide this information to the PCF.

In some embodiments of step 3, the PCF responds with the AF traffic steering response.

In some embodiments of step 4, the NEF forwards the received AF traffic steering response to the AF.

In some embodiments of step 5, meanwhile the H-PCF determines that this UE is currently roaming. This information may be obtained based on the current location of the UE obtained from the UDM, local NRF or other local network function in the home network. Since the roaming type is local breakout, the H-PCF forwards the received AF traffic steering request to the V-PCF.

In some embodiments of step 6, the V-PCF determines that the UE for which this information is intended is currently having active PDU session(s). Hence the V-PCF sends PDU-CAN modification request to the corresponding SMF(s). If multiple SMFs are involved, each SMF may receive this request individually.

In some embodiments of step 7, based on the type of AF request requested by the AF, the SMF determines whether user plane (UP) updates are essential. For example, QOS flow changes.

In some embodiments of step 8, the SMF instructs UPF for updating user plane and also signals the same to the AN/UE.

In some embodiments of step 9, after receiving confirmation from AN/UE and also locally from the UPF, the SMF responds to the V-PCF with the PDU-CAN modification response.

In some embodiments of step 10, the V-PCF responds to the H-PCF with the AF traffic steering response.

In some embodiments of step 11, the H-PCF may send notification directly to the AF or via NEF if the AF has subscribed to UP management event notification.

Figure 17:
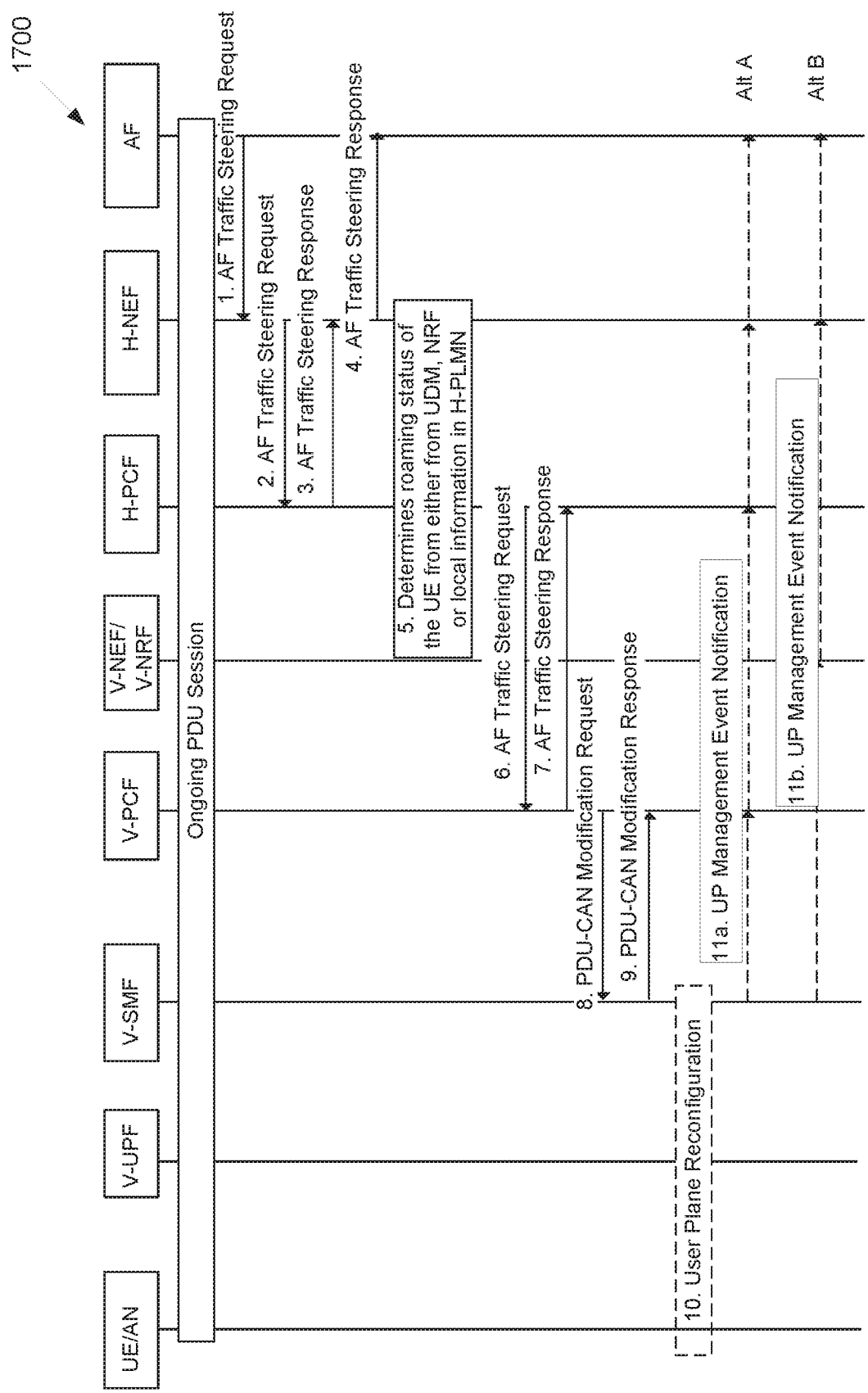
FIG. 17 illustrates an example option 2B—notification via NRF/NEF according to embodiments of the present disclosure.

FIG. 17 illustrates an example option 2B 1700—notification via NRF/NEF according to embodiments of the present disclosure. The embodiment of the option 2B 1700 illustrated in FIG. 17 is for illustration only. FIG. 17 does not limit the scope of the present disclosure to any particular implementation.

As shown in FIG. 17, Steps 1-5 are same as described in Alternative 1A in FIG. 16.

In some embodiments of step 6, the H-PCF informs the receipt of the AF request to the V-PCF by forwarding the AF traffic steering request received from the AF.

In some embodiments of step 7, the V-PCF responds to the H-PCF with the AF traffic steering response.

In some embodiments of step 8, the V-PCF determines that the UE is currently having active PDU session(s). Hence, the V-PCF sends a PDU-CAN modification request to the corresponding SMF(s). If multiple SMFs are involved, each SMF may receive this request individually.

In some embodiments of step 9, after receiving PDU-CAN modification request, relevant SMFs provide response to the V-PCF. Based on the type of AF request requested by the AF, the SMF determines whether user plane (UP) updates are essential. For example, QOS flow changes.

In some embodiments of step 10, the V-SMF(s) instructs UPF for updating user plane and also signals the same to the AN/UE.

In some embodiments of step 11, the V-PCF may send notification to the NRF requesting the NRF to forward to the AF which is in the home network (which then forwards the notification to the H-NEF in the home network) or the V-PCF sends the notification to the V-NEF (which then forwards the notification to the H-NEF). The H-NEF forwards the received notification to the AF.

In some embodiments of option 4—home routed roaming scenario where AF is in home network, services are locally handled in the home network and the AF is also resided in the home network. In this case, two options exist by which the home network informs visited network to update corresponding user plane, (1) H-PCF communicates to the V-PCF or (2) H-SMF communicates with the V-SMF. Both these options are provided as a part of the present disclosure.

Note that in this scenario, there may be two SMFs, one in home network and another one in the visited network. All the service decisions are taken by the SMF in the home network. There are two alternatives exist based on how which NF communicates between two networks.

Figure 18:
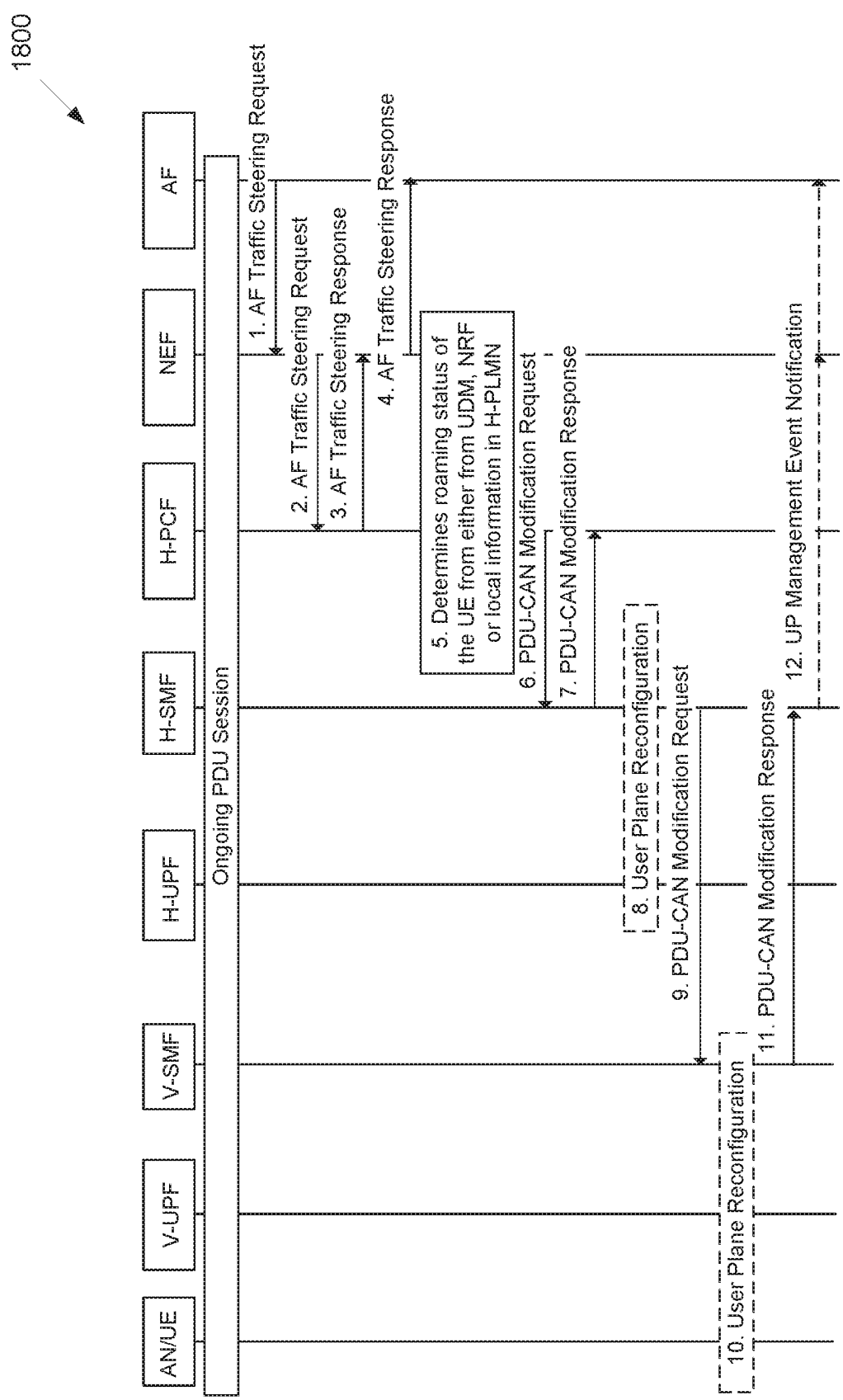
FIG. 18 illustrates an example option 4A—communication with visited network via SMFs according to embodiments of the present disclosure.

FIG. 18 illustrates an example option 4A 1800—communication with visited network via SMFs according to embodiments of the present disclosure. The embodiment of the option 4A 1800 illustrated in FIG. 18 is for illustration only. FIG. 18 does not limit the scope of the present disclosure to any particular implementation.

As shown in FIG. 18, steps 1-5 are same as described in Alternative 1A in FIG. 16.

In some embodiments of step 6, the H-PCF informs the receipt of the AF request to the H-SMF by sending the PDU-CAN modification request based on the AF request received from the AF. Note that there might be multiple PCFs or SMFs involved in the ongoing PDU sessions(s), the H-PCF may send this request to each of these H-SMFs individually.

In some embodiments of step 7, each of these SMFs responds to their relevant PCF(s) with a PDU-CAN modification response message.

In some embodiments of step 8, based on the information received in the PDU-CAN modification request, the H-SMF determines whether there are updates essential to the UP of current PDU session(s). If there are then the H-SMF communicates with corresponding UPF(s). It also determines that this is a roaming scenario. This indication may be provided by the H-PCF or the SMF may obtain this information by some other means.

In some embodiments of step 9, once local UP updates are completed, the H-SMF forwards the PDU-CAN modification request instructing the V-SMF to update the UP.

In some embodiments of step 10, upon receipt of the PDU-CAN modification request from the H-SMF, the V-SMF updates the UP locally by communicating with the UPF over the N4 interface and also instruct the AN/UE to do the same.

In some embodiments of step 11, once all UP updates are completed, the V-SMF sends a response of PDU-CAN modification request to the H-SMF.

In some embodiments of step 12, the H-SMF sends a UP management event notification directly to the AF or via the H-NEF to the AF.

Figure 19:
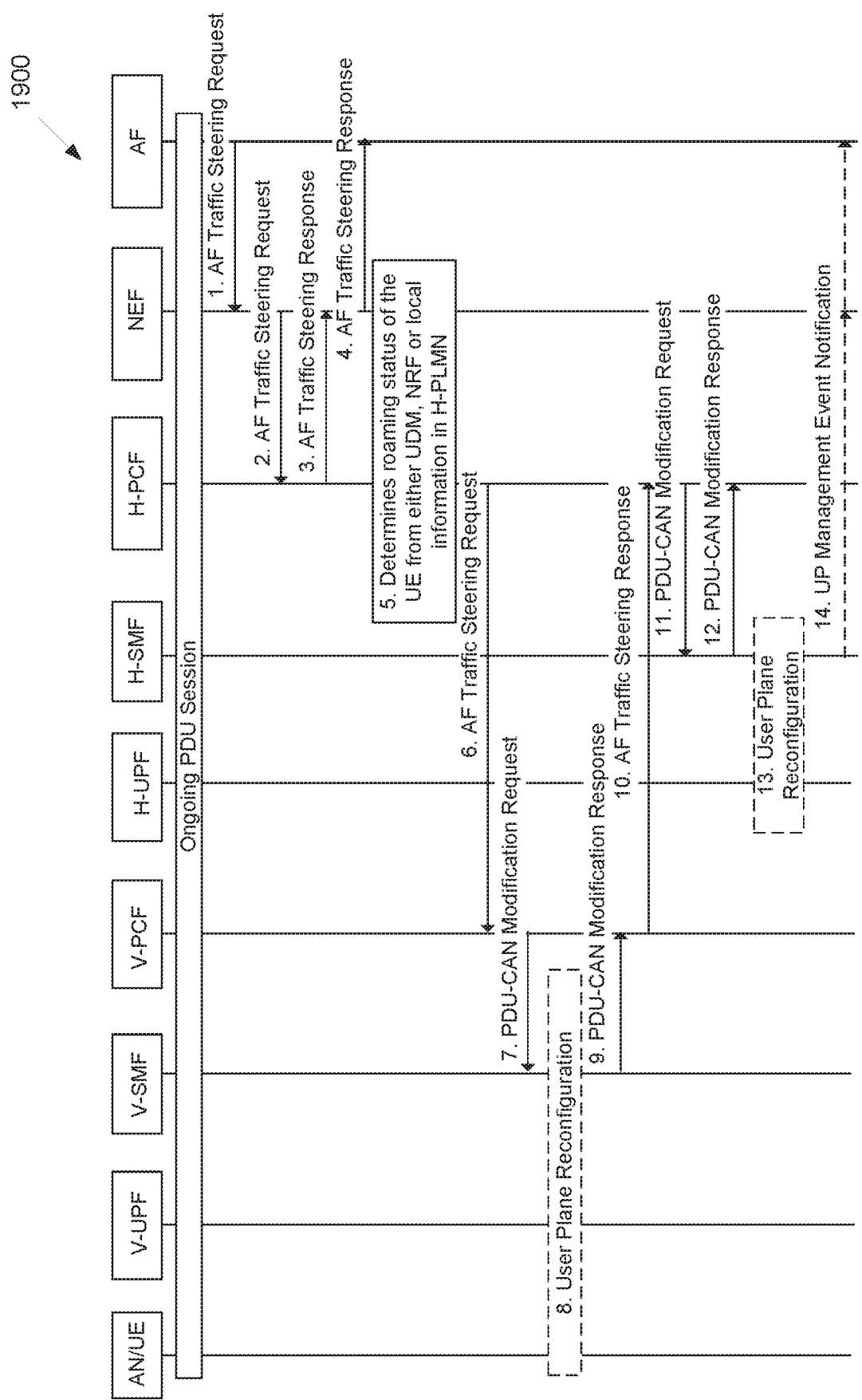
FIG. 19 illustrates an example option 4B—Communication with visited network via PCFs, delay in responding H-PCF according to embodiments of the present disclosure.

FIG. 19 illustrates an example option 4B 1900—communication with visited network via PCFs, delay in responding H-PCF according to embodiments of the present disclosure. The embodiment of the option 4B 1900 illustrated in FIG. 19 is for illustration only. FIG. 19 does not limit the scope of the present disclosure to any particular implementation.

As shown in FIG. 19, steps 1-5 are same as described in Alternative 1A in FIG. 16.

In some embodiments of step 6, the H-PCF informs the receipt of the AF request to the V-PCF(s) by forwarding the AF traffic steering request received from the AF.

In some embodiments of step 7, the V-PCF determines that the UE is currently having active PDU session(s). Hence, the V-PCF sends a PDU-CAN modification request to the corresponding SMF(s). If multiple SMFs are involved, each SMF may receive this request individually.

In some embodiments of step 8, after receiving PDU-CAN modification request, relevant SMFs provide response to the V-PCF. Based on the type of AF request requested by the AF (received within PDU-CAN modification request), the SMF determines whether user plane (UP) updates are essential. For example, QOS flow changes. The V-SMF(s) instructs UPF for updating user plane and also signals the same to the AN/UE.

In some embodiments of step 9, the V-SMF responds to the V-PCF with PDU-CAN modification response.

In some embodiments of step 10, the V-PCF responds to the request of AF traffic steering request to the H-PCF.

In some embodiments of step 11, the H-PCF determines whether UP updates are essential. In that case, the H-PCF sends a PDU-CAN modification request to the relevant SMF(s).

In some embodiments of step 12, after receiving PDU-CAN modification request, relevant SMFs provide response to the H-PCF. Based on the type of AF request requested by the AF (received within PDU-CAN modification request), the SMF determines whether user plane (UP) updates are essential. For example, QOS flow changes.

In some embodiments of step 13, the H-SMF(s) instructs UPF for updating user plane.

In some embodiments of step 14, once the UP is updated successfully, the H-SMF sends a UP management event notification to the AF directly or via the NEF if the NEF has subscribed to the H-SMF.

Figure 20:
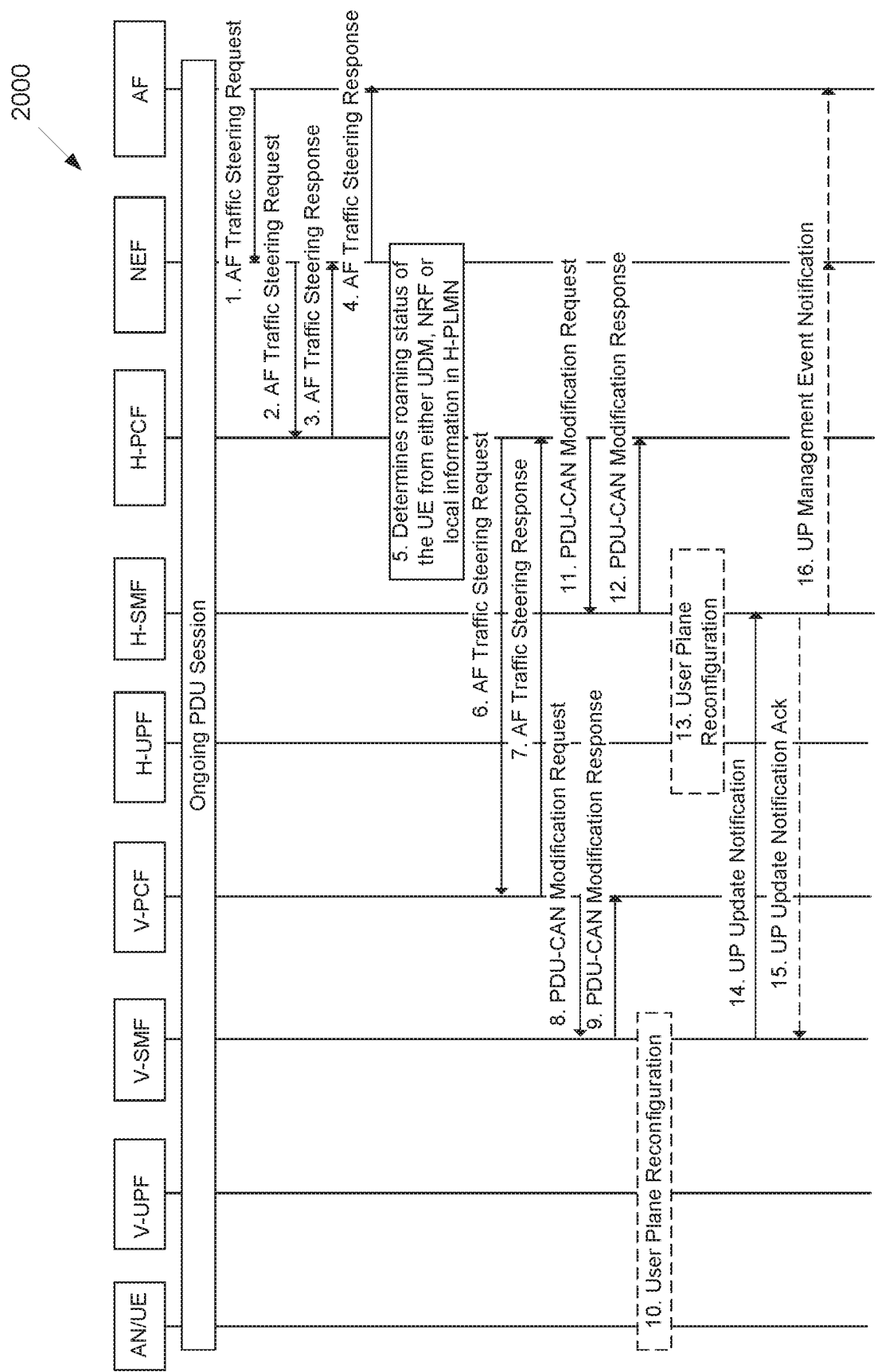
FIG. 20 illustrates an example option 4C—Communication with visited network via PCFs, with additional V-SMF notification according to embodiments of the present disclosure.

FIG. 20 illustrates an example option 4C 2000—communication with visited network via PCFs, with additional V-SMF notification according to embodiments of the present disclosure. The embodiment of the option 4C 2000 illustrated in FIG. 20 is for illustration only. FIG. 20 does not limit the scope of the present disclosure to any particular implementation.

As shown in FIG. 20, steps 1-5 are same as described in Alternative 1A in FIG. 16.

In some embodiments of step 6, the H-PCF informs the receipt of the AF request to the V-PCF by forwarding the AF traffic steering request received from the AF.

In some embodiments of step 7, the V-PCF responds to the H-PCF with the AF traffic steering response.

In some embodiments of step 8, the V-PCF determines that the UE is currently having active PDU session(s). Hence, the V-PCF sends a PDU-CAN modification request to the corresponding SMF(s). If multiple SMFs are involved, each SMF may receive this request individually.

In some embodiments of step 9, after receiving PDU-CAN modification request, relevant V-SMFs provide response to the V-PCF.

In some embodiments of step 10, based on the type of AF request requested by the AF, the V-SMF determines whether user plane (UP) updates are essential. For example, QOS flow changes. The V-SMF(s) instructs UPF for updating user plane and also signals the same to the AN/UE.

In some embodiments of step 11, this step occurs right after step 6. At that time, each involve H-SMF starts timer T update to monitor successful UP updates by the visited network. The H-PCF sends a PDU-CAN modification request to the H-SMF(s). If multiple SMFs are involved, each SMF may receive this request individually.

In some embodiments of step 12, after receiving PDU-CAN modification request, relevant H-SMFs provide response to the H-PCF.

In some embodiments of step 13, based on the type of AF request requested by the AF, the H-SMF determines whether user plane (UP) updates are essential. For example, QOS flow changes. The H-SMF(s) instructs UPF for updating user plane.

In some embodiments of step 14, meanwhile, if H-SMF receives a UP update notification from the V-SMF, timer T update is stopped. Otherwise, the H-SMF may restart the timer or take other action based on the local policy of the home network operator.

In some embodiments of step 15, optionally, the H-SMF provides UP update notification ack to the V-SMF confirming the receipt of the notification.

In some embodiments of step 16, once UP update notification arrives, local UP updates are completed and the subscription to UP management notification event was subscribed by the AF, the H-SMF sends a UP management notification to the H-NEF which then forwards the notification to the AF. The notification may also be sent directly to the AF from the H-SMF.

Optimization of N2 Based Handover

The present disclosure provides details on the procedure used for intra-RAT (from one gNodeB to another gNodeB) where Xn interface is not/cannot be used. The source gNodeB provides handover information to the serving AMF in the core network and the serving AMF then passes this information to the target AMF. In the existing solution, it is assumed that the AMF communicates with the corresponding SMFs when the handover request arrives. The SMF makes sure that user plane resources are available prior to the handover. The present disclosure provides multiple options which are optimized based on whether direct or indirect forwarding of the downlink packets are proposed.

In one embodiment, parallel processing of handover and assignment of resources at the 5GC is considered.

In one embodiment, optimized processing when direct tunneling is used. Direct tunneling may be referred when the N2 handover is requested by the source RAN (S-RAN) when the direct tunneling is not possible to perform Xn based handover in spite of having Xn interface support between S-RAN and target RAN (T-RAN) nodes due to operator's policy, handling of RAN nodes by different AMFs or some other service level agreement or configuration limitations. In some scenarios, it is also possible that there is data connectivity (Internet/IP) but no signaling between S-RAN and T-RAN supported. In those cases also, this type of optimized handover may be applicable. For indirect tunneling, existing solution from LTE specification is assumed.

In one embodiment, non-optimized solution for supporting direct and indirect forwarding using multiple forwarding entities in 5GC is considered. In this solution, if indirect tunneling is used, the forwarding UPFs (F-UPFs) may be selected per session basis and it may also depend on whether UPF relocation is required. So if there are multiple UPFs, it is possible to have multiple F-UPFs to be selected per PDU session.

In one embodiment, optimized solution for supporting direct and indirect forwarding using single forwarding entity in 5GC is considered. All PDU sessions regardless of which SMF the PDU sessions may be controlled by, may be using this single F-UPF to forward downlink packets from the S-RAN to T-RAN. In this case, F-SMF and F-UPF are selected only when indirect tunneling is required (indicated by the S-RAN in handover required message).

In one embodiment, when the handover required is received from the source gNodeB at the AMF, the AMF may immediately send the handover request to the target gNodeB.

In one embodiment, target gNodeB responds to AMF with list of each PDU sessions accepted by the target gNodeB along with UPF address and corresponding tunnel IDs.

In one example, parallel processing of handover and assignment of resources at the 5GC are considered. In one example, optimized processing when direct tunneling is used. Direct tunneling may be referred when the N2 handover is requested by the source RAN (S-RAN) when it is not possible to perform Xn based handover in spite of having Xn interface support between S-RAN and target RAN (T-RAN) nodes due to operator's policy, handling of RAN nodes by different AMFs or some other service level agreement or configuration limitations. In some scenarios, it is also possible that there is data connectivity (Internet/IP) but no signaling between S-RAN and T-RAN supported. In those cases also, this type of optimized handover may be applicable.

In another example, non-optimized solution for supporting direct and indirect forwarding using multiple forwarding entities in 5GC is considered. In this solution, if indirect tunneling is used, the forwarding UPFs (F-UPFs) may be selected per session basis and it may also depend on whether UPF relocation is required. So if there are multiple UPFs, it is possible to have multiple F-UPFs to be selected per PDU session.

In yet another example, optimized solution for supporting direct and indirect forwarding using single forwarding entity in 5GC is considered. All PDU sessions regardless of which SMF the PDU sessions may be controlled by, may be using this single F-UPF to forward downlink packets from the S-RAN to T-RAN. In this case, F-SMF and F-UPF are selected only when indirect tunneling is required (indicated by the S-RAN in handover required message).

An Xn interface referred in the present disclosure is a control and user plane interface defined between two gNodeBs. Since this is still work in progress for 3GPP RAN3 group, the name of this interface may change at the later time. N2 interface refers to control interface between the gNodeB and AMF. N3 interface refers to user plane interface (for transmitting user data) between the gNodeB and UPF. Also RAN and gNodeB are used interchangeably in this document.

This procedure is used to hand over a UE from a source RAN to a target RAN using Xn when the AMF and SMF are unchanged and the SMF decides that the source UPF is to be located. The source UPF referred in this clause is the UPF which terminates N3 interface in the NGC. The presence of IP connectivity between the source UPF and source RAN, and between the target UPF and target RAN, is assumed.

Figure 21A:
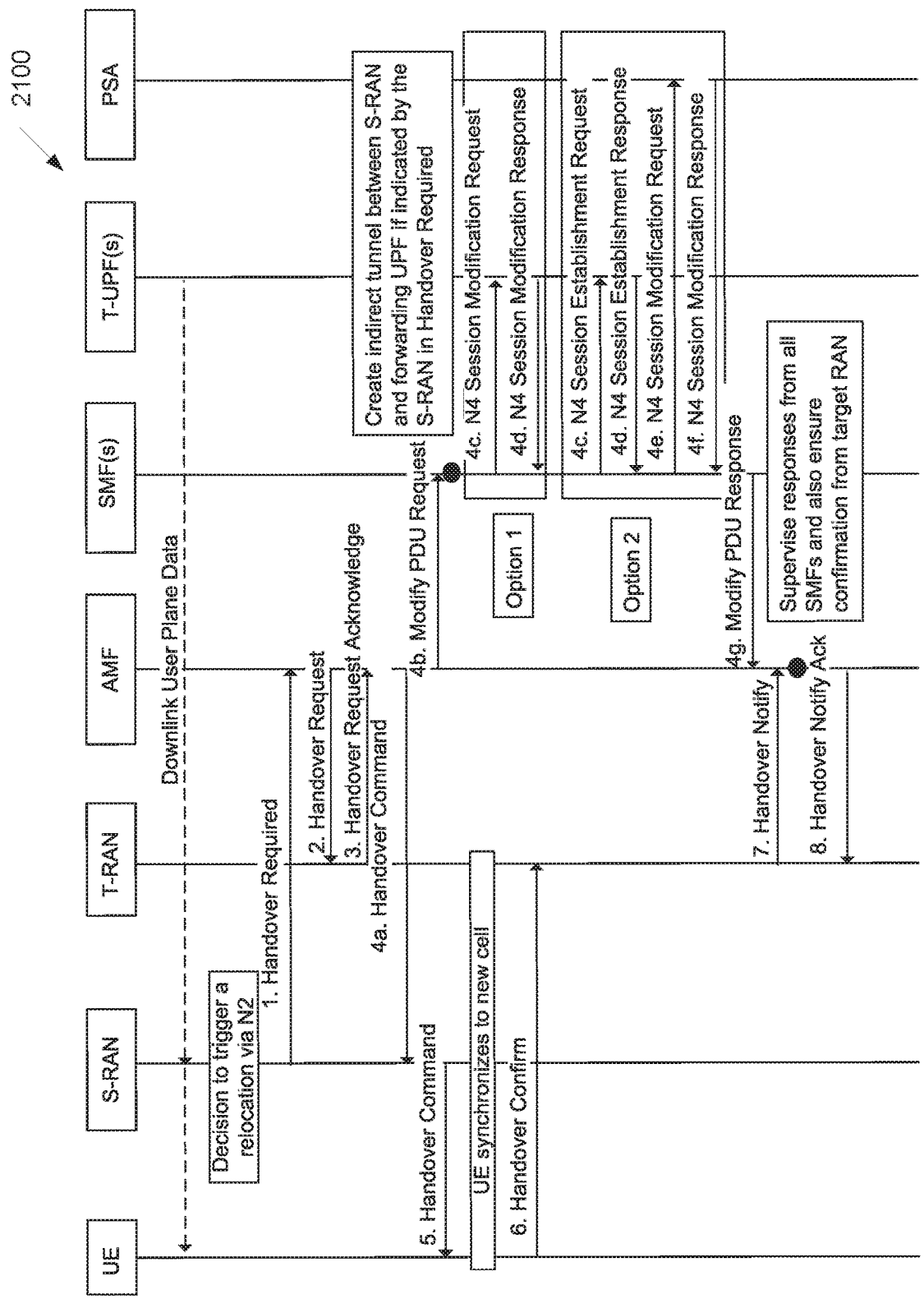
FIG. 21A illustrates an example N2 (non Xn) based handover with and without UPF relocation according to embodiments of the present disclosure.

FIG. 21A illustrates an example N2 (non Xn) based handover 2100 with and without UPF relocation according to embodiments of the present disclosure. The embodiment of the N2 (non Xn) based handover 2100 illustrated in FIG. 21A is for illustration only. FIG. 21A does not limit the scope of the present disclosure to any particular implementation.

Figure 21B:
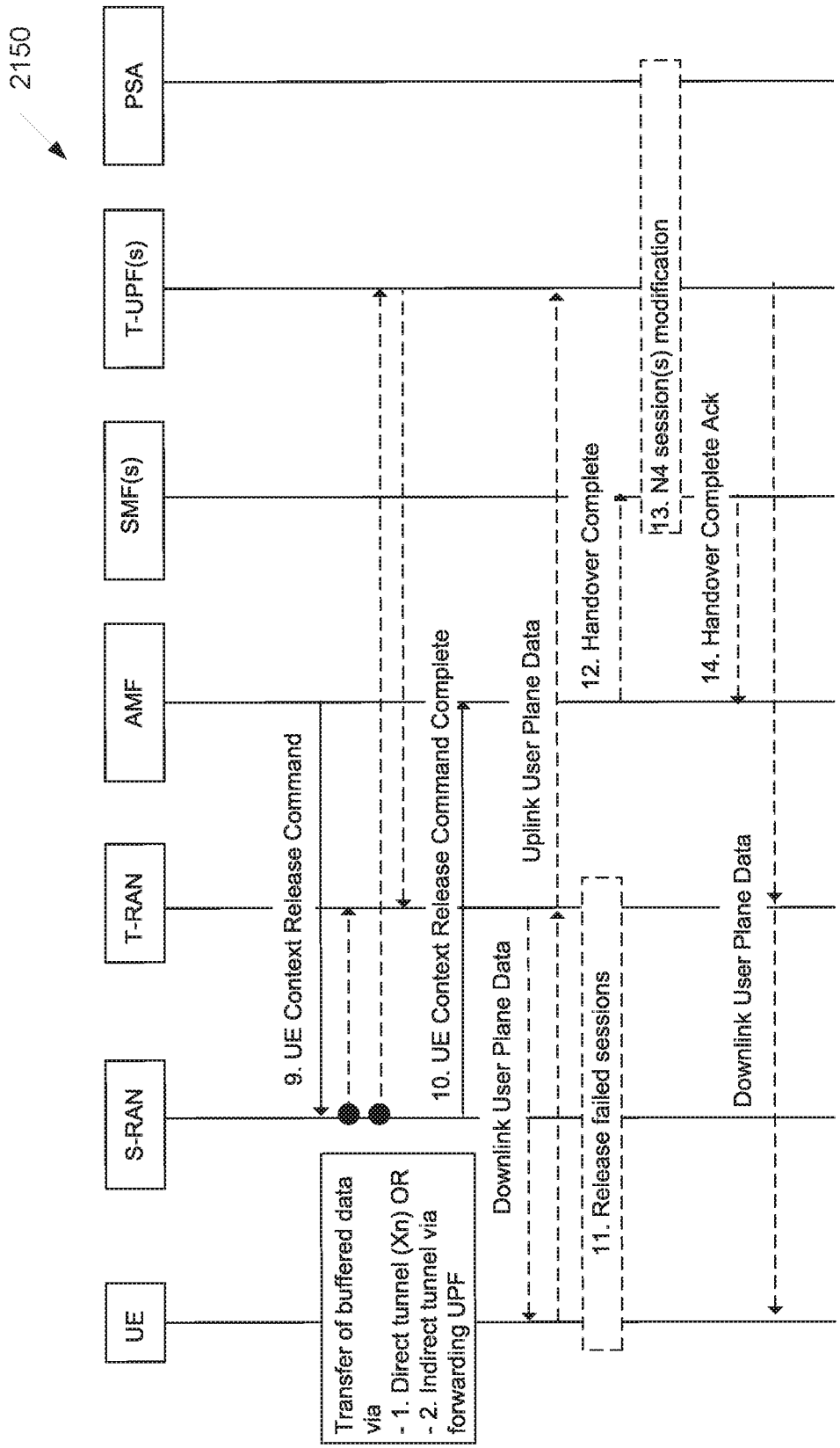
FIG. 21B illustrates an example N2 (non Xn) based handover with and without UPF relocation according to embodiments of the present disclosure.

FIG. 21B illustrates an example N2 (non Xn) based handover 2150 with and without UPF relocation according to embodiments of the present disclosure. The embodiment of the N2 (non Xn) based handover 2150 illustrated in FIG. 21B is for illustration only. FIG. 21B does not limit the scope of the present disclosure to any particular implementation.

In some embodiments of step 1, the source RAN sends an handover required message (target RAN ID, source to target transparent container, PDU session IDs) to an AMF to inform that the UE has moved to a new target cell of target RAN with a list of bearers (PDU sessions IDs) to be switched. Depending on the type of target cell, the target RAN includes appropriate information in this message.

In some embodiments of step 2, upon receipt of this message the AMF constructs the handover request (source to target transparent container, MM N2 Info) message and sends the handover request message to the target RAN based on the target RAN ID included in the handover required message. The source to target transparent container is sent transparently via the AMF to the Target RAN.

In some embodiments of step 3, the target RAN responds with the handover request acknowledgement (target to source transparent container, SM N2 Response list, PDU sessions failed to be setup list). The target to source transparent container includes UE container with an access stratum part and a NAS part. The UE container is transparently sent via AMF and S-RAN to the UE. This message also includes list of PDU sessions which have failed to be switched. For each accepted PDU sessions, the target RAN provides the UP address and tunnel information at the target RAN.

In some embodiments of step 4a, the AMF sends handover command to the source RAN (Target to source transparent container, PDU sessions failed to be setup list). The source RAN uses the PDU sessions failed to be setup list and the indicated reason for failure to decide whether to proceed with the N2 handover procedure. The AMF also requests release of PDU sessions to corresponding SMFs, if the PDU sessions (or full QoS flows of those sessions) are not part of the PDU sessions (or QoS flows) list received earlier from the Source RAN.

In some embodiments of step 4b, meanwhile the AMF initiates user plane resource allocation by sending modify PDU request (PDU Session IDs, SM N2 Response list) to the SMF. Upon receiving this message, the SMF determines whether the existing UPF can still handle PDU sessions or the SMF requires allocation of new intermediate UPF (which is not PDU session anchor). If source RAN has notified of having indirect tunneling at that time, the SMF selects forwarding UPF which may or may not be the target UPF and sends address and tunnel points of the source RAN. This can happen any time prior to step 8.

In some embodiments, use of existing UPF is considered. In one example of 4c, if the SMF decides to keep the existing UPF, the SMF may send N4 session modification request (PDU session ID, SM N2 response) to the existing UPF. In another example of 4d, the corresponding UPF updates the UPF's existing tunnel based on the information received in the SM N2 response from the target RAN and responds with the N4 session modification response (PDU session ID, SM N2 Info) to the SMF. SM N2 Info contains UP address and tunnel identifiers of the existing UPF. Note that SMF may be aware of SM N2 Info of the existing UPF. Since this information may not change, UPF may avoid including SM N2 Info in the response.

In some embodiments, use of new intermediate UPF is considered. In one example of 4c, if the SMF decides to assign a new intermediate UPF (not PSA), the SMF may send N4 session establishment request (PDU session ID, SM N2 Response, SM N2 Info (optional)) to that new UPF. In another example of 4d, the corresponding UPF assigns new user plane resources based on tunnel information received from the SMF in SM N2 Info and also updates tunnel information for the target RAN based on the information received in the SM N2 response. If SM N2 Info is not received, the UPF allocates this information. It then responds with the N4 session modification response (PDU Session ID, SM N2 Info) to the SMF. SM N2 Info contains UP address and tunnel identifiers of the existing UPF for both uplink and downlink transmissions. Note that SMF may be aware of SM N2 Info of the existing UPF. Since this information may not change, UPF may avoid including SM N2 Info in the response.

In yet another example of 4e-4f, since this is a new UPF, the SMF also updates existing PDU session anchor (PSA) by sending N1 session modification request (PDU session ID, SM N2 Info). The PSA updates the PSA's tunnel end points toward the new intermediate UPF and provides response to the SMF. In yet another example of 4g, once user plane resources are allocated/assigned, each SMF responds to the AMF by sending modify PDU response message (PDU Session ID, SM N2 Info). At that time, SMF also provides information on the forwarding UPF to the AMF for indirect tunnel establishment.

If there are multiple SMFs involved, the AMF starts supervising timer once the response from first SMF is received. The UPF associated with that UPF is used as a forwarding UPF for all PDU sessions of the UE.

In some embodiments of step 5, once source RAN makes decision to proceed with N2 handover, the source RAN sends a handover command (Target to source transparent container) message to the UE. Target to source transparent container is the same which was received from the target RAN earlier by the AMF.

In some embodiments of step 6, after the UE has successfully synchronized the target cell, the UE sends a handover confirm message to the target RAN. At this point handover is assumed to be successful.

In some embodiments of step 7, the AMF manages timers waiting for handover notify such a way that the AMF receives modify PDU response message (PDU session ID, SM N2 Info) from all relevant SMF(s). At that time, the AMF formulates SM N2 Info list. Note that there may timer monitoring/supervising responses from all relevant SMFs and also for monitoring handover notify message from the target RAN. It is implementation choice whether the timer monitoring/supervising responses can be individual or combined in one.

In some embodiments of step 8, after receiving handover notify, the AMF responds to the target RAN by sending handover notify acknowledgement (SM N2 Info list, PDU session failed list). Tunnel IDs are expected to be updated by the target RAN at this time based on the information of SM N2 Info list. Note that instead of defining new handover notify/handover notify acknowledgement, existing N2 path switch request/N2 path switch request Ack may also be used.

In some embodiments of step 9, the AMF requests the source RAN to release UE context. As a part of UE context release, the S-RAN also releases downlink data which were buffered either using direct tunnel to the T-RAN if available. Otherwise, buffered data is transported using indirect tunnel to the T-RAN via forwarding UPF as discussed in step 4b. For that, it is essential that the AMF sends address of forwarding UPF and tunnel end points to the source RAN which are received in step 4g from the SMF(s). If multiple SMFs are sending this information, the AMF may forward information of multiple UPFs or just one (received in first PDU handover request) UPF.

After transporting downlink data, the source RAN releases indirect tunneling with the forwarding UPF.

In some embodiments of step 10, after cleaning all resources, source RAN responds to the AMF with a UE context release command complete message.

In some embodiments of step 11, if PDU session failed list received from the AMF is non-empty, the target RAN initiates release of PDU sessions which have failed switching context in the core network.

In some embodiments of step 12, after responding to target RAN with the handover notify acknowledgement, the AMF may notify each SMF with handover complete (PDU Session ID, SM N2 response (if received)). The tunnel end points are updated by corresponding UPFs at that time and the response is sent to the AMF.

In alternative solution, the target RAN does not send the RAN's UP address and tunnel ID information in handover request ack. Instead the target RAN decides to send this information in the handover notify (N2 path switch request). But this may cause higher latency and issue of dropped packets.

In some embodiments of option 2—reuse of Xn based handover, the option 2 includes an alternative where if there is a direct connectivity between source and target UPFs is available to transfer user data traffic, existing Xn based HO may be reused.

Figure 22:
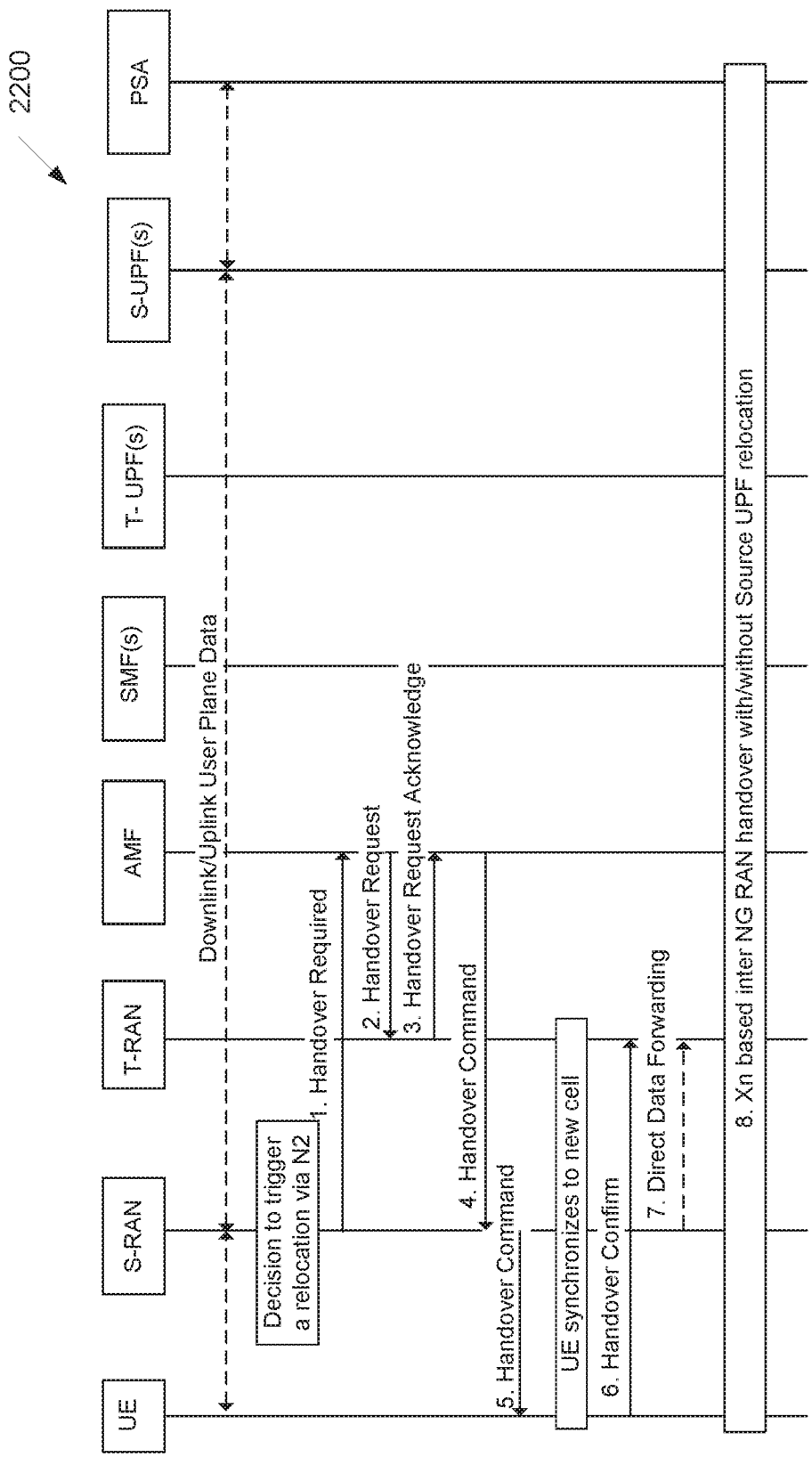
FIG. 22 illustrates an example reuse of Xn based HO if direct connectivity between source and target UPFs exists according to embodiments of the present disclosure.

FIG. 22 illustrates an example reuse of Xn based HO 2200 if direct connectivity between source and target UPFs exists according to embodiments of the present disclosure. The embodiment of the reuse of Xn based HO 2200 illustrated in FIG. 22 is for illustration only. FIG. 22 does not limit the scope of the present disclosure to any particular implementation.

In some embodiments of step 1 (S-RAN to AMF, handover required (target ID, source to target transparent container, PDU session IDs, indirect tunneling available)), source to target transparent container includes RAN information created by S-RAN to be used by T-RAN, and is transparent to 5GCN. All PDU sessions handled by S-RAN (i.e. all existing PDU sessions with active UP connections) may be included in the handover required message, indicating which of those PDU session(s) are requested by S-RAN to handover. Presence of indirect tunneling available parameter indicates availability of the direct forwarding of data packets from the S-RAN to the T-RAN.

In some embodiments of step 2 (AMF to T-RAN, handover request (source to target transparent container, MM N2 info)), AMF determines T-RAN based on target ID. AMF may allocate a GUTI valid for the UE in the AMF and target TAI. Source to target transparent container is forwarded as received from S-RAN. MM N2 info includes e.g. security information and handover restriction list.

In some embodiments of step 3 (T-RAN to AMF, handover request acknowledge (target to source transparent container, SM N2 response list, PDU sessions failed to be setup list)), target to source transparent container includes a UE container with an access stratum part and a NAS part.

The UE container is sent transparently via AMF and S-RAN to the UE. The SM N2 response list includes a PDU session ID and an SM N2 response indicating the PDU session ID and if T-RAN accepted the N2 handover request for the PDU session. For each by T-RAN accepted PDU session for N2 Handover, the SM N2 response includes N3 UP address and tunnel ID of T-RAN. The information provided by the T-RAN also contains a list of PDU session IDs indicating PDU sessions failed to be setup and reason for failure. This information is intended to be sent to the S-RAN.

In some embodiments of step 4 (AMF to S-RAN, handover command (target to Source transparent container, PDU sessions failed to be setup list)), target to source transparent container and PDU sessions failed to be setup list are forwarded as received from the AMF. S-RAN uses the PDU sessions failed to be setup list and the indicated reason for failure to decide whether to proceed with the N2 handover procedure.

In some embodiments of step 5 (S-RAN to UE, handover command (UE container)), a UE container is a UE part of the target to source transparent container which is sent transparently from T-RAN via AMF to S-RAN and is provided to the UE by the S-RAN.

In some embodiments of step 6 (UE to T-RAN, handover confirm), after the UE has successfully synchronized to the target cell, the UE sends a handover confirm message to the T-RAN. Handover is by this message considered as successful by the UE.

In some embodiments of step 7, once UE synchronizes to new cell, the S-RAN may start forwarding downlink data from the S-RAN towards the T-RAN.

In some embodiments of step 8 (T-RAN to AMF, N2 path switch request (PDU session IDs)), LTE specification is referred for further processing of this procedure depending on whether UPF relocation of the target UPF is required by the target UPF's corresponding SMF.

In some embodiment of option 3—separate indirect tunneling for PDU sessions handled by different UPFs, this scenario is applicable when there is a direct connectivity between the source and target RAN nodes available. It is also applicable when the source RAN node indicates that an indirect tunneling is required to forward downlink packets from the source RAN node to the target RAN node. This indirect tunneling may be handled differently for different PDU sessions.

Figure 23A:
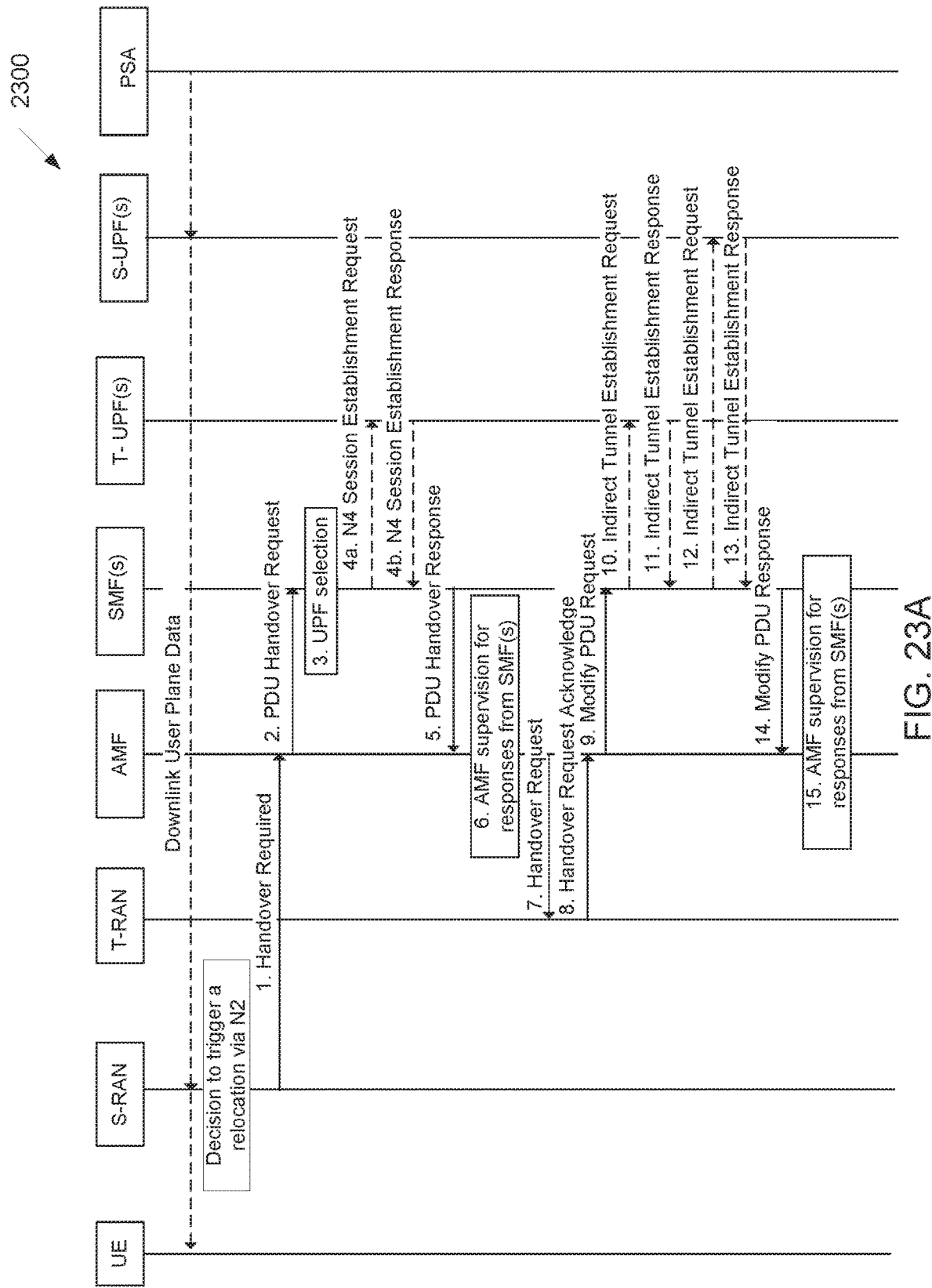
FIG. 23A illustrates an example use of multiple forwarding UPF for forwarding downlink data to the target RAN node according to embodiments of the present disclosure.

FIG. 23A illustrates an example use of multiple forwarding UPF 2300 for forwarding downlink data to the target RAN node according to embodiments of the present disclosure. The embodiment of the use of multiple forwarding UPF 2300 illustrated in FIG. 23 is for illustration only. FIG. 23 does not limit the scope of the present disclosure to any particular implementation.

Figure 23B:
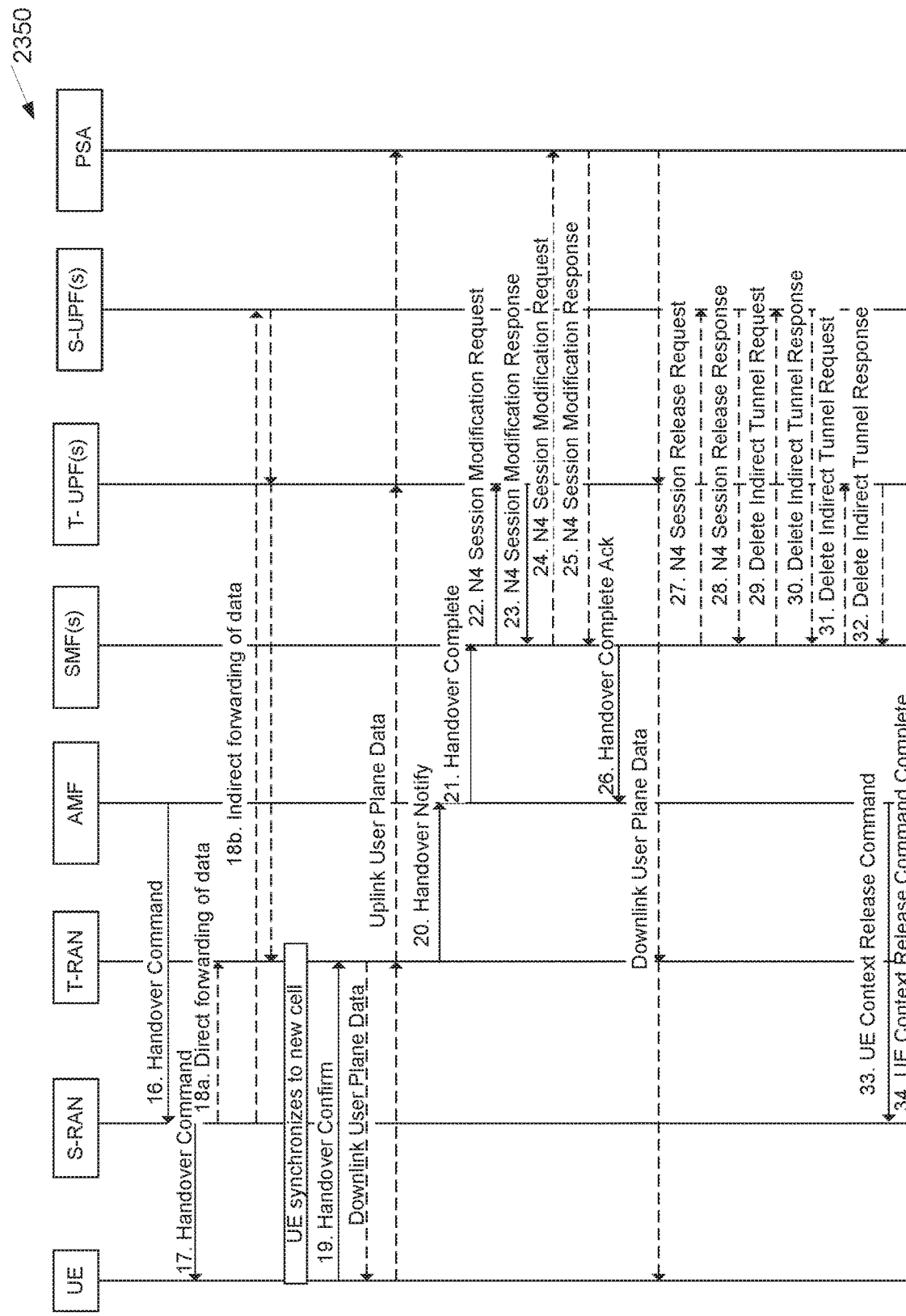
FIG. 23B illustrates an example use of multiple forwarding UPF for forwarding downlink data to the target RAN node according to embodiments of the present disclosure.

FIG. 23B illustrates an example use of multiple forwarding UPF 2350 for forwarding downlink data to the target RAN node according to embodiments of the present disclosure. The embodiment of the use of multiple forwarding UPF 2350 illustrated in FIG. 23B is for illustration only. FIG. 23B does not limit the scope of the present disclosure to any particular implementation.

In some embodiments of step 1 (S-RAN to AMF: handover required (Target ID, Source to Target transparent container, PDU session IDs), source to target transparent container includes RAN information created by S-RAN to be used by T-RAN, and is transparent to 5GCN. All PDU sessions handled by S-RAN (i.e. all existing PDU sessions with active UP connections) may be included in the handover required message, indicating which of those PDU session(s) are requested by S-RAN to handover.

In some embodiments of step 2 (AMF to SMF: PDU handover request (PDU session ID, Target ID), this message is sent for each PDU-session indicated, by S-RAN, as an N2 handover candidate. PDU session ID indicates a PDU session candidate for N2 handover.

In some embodiments of step 3, based on the new location info, SMF checks if N2 handover for the indicated PDU session can be accepted. The SMF checks also the UPF selection criteria according to LTE specification. If a UE has moved out of the service area of the UPF connecting to RAN, SMF selects a new intermediate UPF.

In some embodiments of step 4a ((conditional) SMF to T-UPF (intermediate): N4 session establishment request)), if the SMF selects a new intermediate UPF, target UPF (T-UPF), for the PDU session and if CN tunnel Info is allocated by the T-UPF, an N4 session establishment request message is sent to the T-UPF, providing packet detection, enforcement and reporting rules to be installed on the T-UPF. The PDU session anchor tunnel info for this PDU session is also provided to the T-UPF.

In some embodiments of step 4b ((conditional) T-UPF (intermediate) to SMF: N4 session establishment response), the T-UPF sends an N4 session establishment response message to the SMF with CN DL tunnel info and UL Tunnel info (i.e. N3 tunnel info). The SMF starts a timer, to be used in step 21a.

In some embodiments of step 5 (SMF to AMF: PDU handover response (PDU session ID, SM N2 info)), the SMF includes the result in SM N2 info sent, transparently for the AMF, to the T-RAN. If N2 handover for the PDU session is accepted the SM N2 info also includes PDU session ID, N3 UP address and tunnel ID of UPF, and QoS parameters.

In some embodiments of step 6, AMF supervises the PDU handover response messages from the involved SMFs. The lowest value of the max delay indications for the PDU sessions that are candidates for handover gives the maximum time AMF may wait for PDU handover response messages before continuing with the N2 handover procedure. At expiry of the maximum wait time or when all PDU handover response messages are received, AMF continues with the N2 handover procedure (handover request message in step 8). A PDU handover response message arriving too late (see step 5) is indicated to the SMF allowing the SMF to deallocate a possibly allocated N3 UP address and tunnel ID of the selected UPF. A PDU session handled by that SMF is considered deactivated and handover attempt is terminated for that PDU session. In one example, step 6 may start at step 4 and be performed in parallel with that and later steps.

In some embodiments of step 7 (AMF to T-RAN: handover request (source to target transparent container, MM N2 info, SM N2 info list)), AMF determines T-RAN based on target ID. AMF may allocate a GUTI valid for the UE in the AMF and target TAI. Source to target transparent container is forwarded as received from S-RAN. MM N2 info includes e.g. security information and handover restriction list. SM N2 info list includes SM N2 info from SMFs in the PDU handover response messages received within allowed max delay supervised by the AMF mentioned in step 6.

In some embodiments of step 8 (T-RAN to AMF: handover request acknowledge (target to source transparent container, SM N2 response list, PDU sessions failed to be setup list)), Target to source transparent container includes a UE container with an access stratum part and a NAS part. The UE container is sent transparently via AMF and S-RAN to the UE. The information provided to the S-RAN also contains a list of PDU session IDs indicating PDU sessions failed to be setup and reason for failure (SMF decision, SMF response too late, or T-RAN decision). The SM N2 response list includes, per each received SM N2 info and by SMF accepted PDU session for N2 handover, a PDU session ID and an SM N2 response indicating the PDU session ID and if T-RAN accepted the N2 handover request for the PDU session. For each by T-RAN accepted PDU session for N2 handover, the SM N2 response includes N3 UP address and tunnel ID of T-RAN.

In some embodiments of step 9 (AMF to SMF: modify PDU request (PDU session ID, SM N2 response)), for each SM N2 response received from the T-RAN (included in SM N2 response list), AMF sends the received SM N2 response to the SMF indicated by the respective PDU session ID. If no new T-UPF is selected, SMF stores the N3 tunnel info of T-RAN from the SM N2 response if N2 handover is accepted by T-RAN.

In some embodiments of step 10 ((conditional) SMF to T-UPF: indirect tunnel establishment request (PDU session ID, T-RAN address, forwarding tunnel ID), if indirect forwarding applies and the UPF is relocated, the SMF sends an indirect tunnel establishment request to the T-UPF. Forwarding tunnel ID is tunnel ID allocated by T-RAN for forwarding data. If the UPF is not relocated, indirect tunneling may be set up in step 12. Indirect tunneling may be performed via a UPF which is different from the selected UPF for user data.

In some embodiments of step 11 ((conditional) T-UPF to SMF: indirect tunnel establishment response (PDU Session ID, T-UPF address, forwarding tunnel ID), the T-UPF responds with the forwarding address and Tunnel ID to the SMF.

In some embodiments of step 12 ((conditional) SMF to S-UPF: indirect tunnel establishment request (PDU session ID, forwarding UP address, forwarding tunnel ID), if indirect forwarding applies, the SMF sends an indirect tunnel establishment request to the S-UPF. Forwarding UP address may be the address of the T-RAN or address of the UPF-T depending whether the UPF is relocated. Forwarding tunnel ID may be the tunnel ID assigned by the forwarding entity.

In some embodiments of step 13 ((conditional) S-UPF to SMF: indirect tunnel establishment response (PDU session ID, S-UPF address, forwarding tunnel ID), the S-UPF responds with the forwarding address and tunnel ID to the SMF. Forwarding tunnel ID is tunnel ID allocated by S-UPF for forwarding data.

In some embodiments of step 14 (SMF to AMF: modify PDU response (PDU session ID), this message is sent for each received Modify PDU Request message. If N2 handover is not accepted by T-RAN, SMF deallocates N3 UP address and tunnel ID of the selected UPF. SMF acknowledges the modify request message by sending modify PDU response message to AMF.

In some embodiments of step 15, AMF supervises the modify PDU response messages from the involved SMFs. The lowest value of the max delay indications for the PDU sessions that are candidates for handover gives the maximum time AMF may wait for modify PDU response messages before continuing with the N2 Handover procedure. At expiry of the maximum wait time or when all modify PDU response messages are received, AMF continues with the N2 handover procedure. A Modify PDU response message arriving too late (see step 14) is indicated to the SMF allowing the SMF to deallocate a possibly allocated N3 UP address and tunnel ID of the selected UPF. A PDU session handled by that SMF is considered deactivated and handover attempt is terminated for that PDU session.

In some embodiments of step 16 (AMF to S-RAN: handover command (target to source transparent container, PDU sessions failed to be setup list)), target to Source transparent container is forwarded as received from AMF. S-RAN uses the PDU sessions failed to be setup list and the indicated reason for failure to decide whether to proceed with the N2 Handover procedure.

In some embodiments of step 17 (S-RAN to UE: handover command (UE container)), a UE container is a UE part of the target to source transparent container which is sent transparently from T-RAN via AMF to S-RAN and is provided to the UE by the S-RAN.

In some embodiments of step 18, the S-RAN starts forwarding of downlink data from the S-RAN toward the T-RAN for PDU sessions subject to data forwarding. This may be either direct (step 18a) or indirect forwarding (step 18b).

In some embodiments of step 19 (UE to T-RAN: handover confirm), after the UE has successfully synchronized to the target cell, the UE sends a handover confirm message to the T-RAN. Handover is by this message considered as successful by the UE. Downlink data can now be forwarded to the UE by the T-RAN. Also, uplink data traffic can also be supported via T-UPF at this time.

In some embodiments of step 20 (T-RAN to AMF: handover notify), handover is by this message considered as successful in T-RAN.

In some embodiments of step 21 (AMF to SMF: handover complete (PDU session ID)), handover complete is sent per each PDU session to the corresponding SMF to indicate the success of the N2 handover. Upon receipt of the handover complete message, the SMF starts a timer if temporary resources were allocated for supporting indirect forwarding or intermediate S-UPF is relocated. For all PDU sessions which are inactive or failed to handover to the T-UPF, the SMF releases resources for them.

In some embodiments of step 22 (SMF to T-UPF: N4 session modification request (PDU session ID, N3 UP address, Tunnel ID of T-RAN)), the SMF sends N4 session modification request message to T-UPF providing N3 UP address and tunnel ID of T-RAN for each PDU sessions accepted by the T-RAN.

In some embodiments of step 23 (T-UPF to SMF: N4 session modification response), T-UPF responds to the SMF.

In some embodiments of step 24 ((conditional) SMF to UPF (PSA): N4 session modification request (PDU session ID, T-UPF UP address, downlink tunnel ID of T-UPF)), the SMF sends N4 session modification request message to PDU session anchor UPF, UPF (PSA), providing N3 tunnel info of T-RAN the or DL tunnel info of T-UPF if T-UPF is selected.

In some embodiments of step 25 ((conditional) UPF (PSA) to SMF: N4 session modification response), the UPF (PSA) sends N4 session modification response message to SMF. At this point, UPF (PSA) starts sending downlink packets to the T-RAN, via T-UPF if T-UPF is selected.

In some embodiments of step 26 (SMF to AMF: handover complete Ack (PDU session ID)), SMF confirms reception of handover complete.

In some embodiments of step 27 ((conditional) SMF to S-UPF (intermediate): N4 session release request), if there is a source intermediate UPF, the SMF initiates resource release, after timer which was started in step 21 expires, by sending an N4 session release request (release cause) to source UPF.

In some embodiments of step 28 (S-UPF to SMF: N4 session release response), the S-UPF acknowledges with an N4 session release response message to confirm the release of resources.

In some embodiments of step 29 (SMF to S-UPF: delete indirect tunnel request (PDU session ID)), if indirect forwarding was used then the expiry of the timer at the SMF at step 21 triggers the SMF to send a delete indirect tunnel request message to the S-UPF to release temporary resources used for indirect forwarding that were allocated at steps 12-13.

In some embodiments of step 30 (S-UPF to SMF: delete indirect tunnel response (PDU session ID)), the SMF acknowledges release of temporary resources.

In some embodiments of step 31 (SMF to T-UPF: delete indirect tunnel request (PDU session ID)), if the indirect forwarding was used and the UPF was relocated then the expiry of the timer at the SMF at step 21 triggers the SMF to send a delete indirect tunnel request to the T-UPF to release temporary resources used for indirect forwarding that were allocated at steps 10-11.

In some embodiments of step 32 (T-UPF to SMF: delete indirect tunnel response (PDU session ID)), the SMF acknowledges release of temporary resources.

In some embodiments of step 33 (AMF to S-RAN: UE context release command), the AMF sends UE context release command.

In some embodiments of step 34 (S-RAN to AMF: UE context release complete), the source RAN releases the source RAN's resources related to the UE and responds with a UE context release complete message.

In some embodiments of option 4—one indirect tunneling for PDU sessions handled by different UPFs, this scenario is applicable when there is a direct connectivity between the source and target RAN nodes available. It is also applicable when the source RAN node indicates that an indirect tunneling is required to forward downlink packets from the source RAN node to the target RAN node. This indirect tunneling may be handled by one forwarding UPF for all PDU sessions related to the UE which is having this N2 handover attempt.

Figure 24:
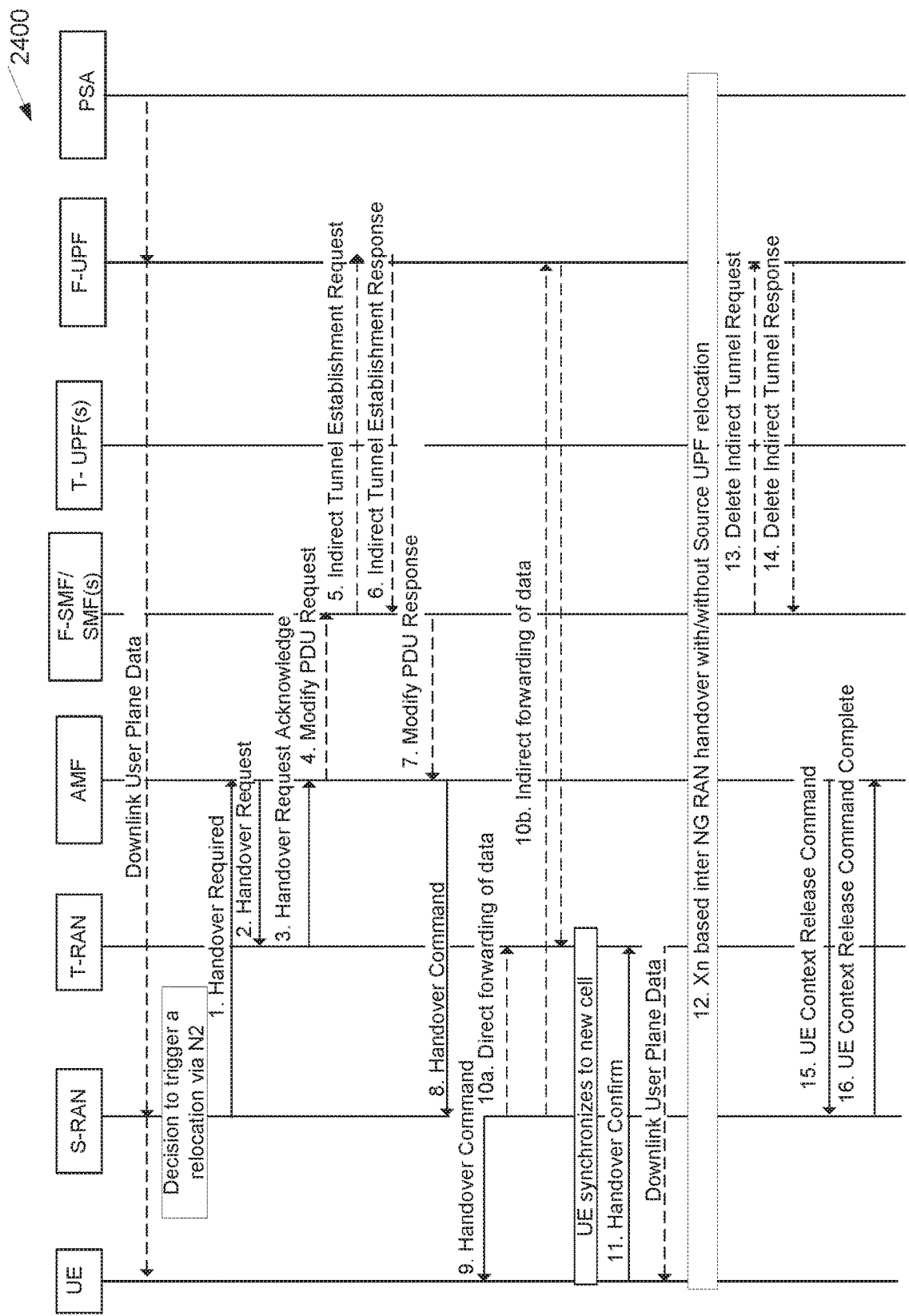
FIG. 24 illustrates an example use of single forwarding UPF for forwarding downlink data to the target RAN node according to embodiments of the present disclosure.

FIG. 24 illustrates an example use of single forwarding UPF 2400 for forwarding downlink data to the target RAN node according to embodiments of the present disclosure. The embodiment of the use of single forwarding UPF 2400 illustrated in FIG. 24 is for illustration only. FIG. 24 does not limit the scope of the present disclosure to any particular implementation.

FIG. 24 shows use of single forwarding UPF for forwarding downlink data to the target RAN node.

Steps 1 in FIG. 24 is same as steps 1 defined for option 3. Steps 2-3 in FIG. 24 are same as steps 7-8 defined for option 3.

In some embodiments of step 4 ((conditional) AMF to forwarding SMF: modify PDU request (PDU session ID, forwarding info), this step is performed if the S-RAN indicates a need of having indirect tunneling to forward data packets to the T-RAN in the handover required message. The AMF sends the received forwarding info to the SMF indicated by the respective PDU session ID. If T-RAN sends forwarding info per PDU session (having multiple forwarding tunnel IDs), it is up to the forwarding SMF how to handle the info per PDU session. The forwarding SMF may select one from the list or the forwarding SMF may send error requesting to send just one forwarding tunnel ID. The AMF may also receive SM N2 Info (for N3 interface) from T-RAN. In that case, the AMF may store the SM N2 Info and/or forward the SM N2 Info to the SMF. See details in step 5 of this procedure on how F-SMF may be selected by the AMF. The SM N2 Info (for N3 interface) may be received in path switch request from the T-RAN at the later time as a part of step 12.

In some embodiments of step 5 ((conditional) SMF to forwarding UPF (F-UPF): indirect tunnel establishment request (PDU Session ID, T-RAN UP address, forwarding tunnel ID of T-RAN), upon receipt of the modify PDU request, the SMF selects forwarding UPF (F-UPF). This step 5 can be performed by the forwarding SMF (F-SMF) handling one of existing PDU sessions or the step 5 may be pre-defined by the network just to perform forwarding function. It is up to the operator's policy or local regarding how to select F-SMF and also F-UPF. Similar logic is applicable for selecting the F-UPF. The F-SMF sends an indirect tunnel establishment request to the F-UPF.

In some embodiments of step 6 ((conditional) F-UPF to SMF: indirect tunnel establishment response (PDU session ID, F-UPF UP address, forwarding tunnel ID of F-UPF). The UP address and forwarding tunnel ID of the F-UPF is sent to the SMF. Note that this information may also be available at the SMF depending on operator's policy on where UP address and tunnel IDs are allocated (at SMF or UPF).

In some embodiments of step 7 ((conditional) SMF to AMF: modify PDU response (UP address and tunnel IDs of F-UPF)), the SMF forwards UP address and tunnel IDs of F-UPF to the AMF.

In some embodiments, steps 8-11 are same as steps 16-19 shown for option 3.

In some embodiments of step 12, LTE specification is referred for further processing of this procedure depending on whether UPF relocation of the target UPF is required by the UPF's corresponding SMF. As a part of step 12, the forwarding SMF starts timer to monitor data forwarding over the indirect tunnel.

In some embodiments of step 13-14, if the indirect forwarding was used and the UPF was relocated then the expiry of the timer at the SMF at step 12 triggers the SMF to send a Delete Indirect Tunnel Request to the T-UPF to release temporary resources used for indirect forwarding that were allocated at steps 5-6.

In some embodiments, steps 15-16 are same as steps 33-34 shown for option 3.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. An electronic device for protocol data unit (PDU) session management, the electronic device comprising:
    a processor configured to initiate a PDU session for an application function (AF) within an application server (AS) that is not part of a cellular network; and
    a transceiver operably connected to the processor, the transceiver configured to:
        transmit configuration information for an authorization of the AS to a network exposer function (NEF) to communicate directly with a network function (NF) of the cellular network and the AS that is not part of the cellular network to provide PDU services for the PDU session;

receive authorization of the AS from the NEF based on the configuration information; and communicate directly with the cellular network NF to provide the PDU services during the PDU session.

2. The electronic device of claim 1, wherein the transceiver is further configured to:

send subscription information to the NEF and parameters including an application identifier for which subscription is requested; and receive event notifications for the subscription via the NEF.

3. The electronic device of claim 2, wherein the subscription is for an event including at least one of user plane management, mobility, or a user equipment (UE) location.

4. The electronic device of claim 1, wherein the transceiver is further configured to:

send a traffic rules registration message to the NEF and parameters including an application identifier for which traffic rules apply; and receive a traffic rules registration acknowledgement via the NEF.

5. The electronic device of claim 1, wherein:

the transceiver is further configured to receive application service information from the cellular network; and the processor is further configured to trigger a new PDU session based on the received application service information.

6. The electronic device of claim 1, wherein:

the transceiver is further configured to receive application service information from the cellular network; and the processor is further configured to update an existing PDU session based on the received application service information.

7. The electronic device of claim 1, wherein the AF uses a session management function (SMF) or a policy control function (PCF) for direct communication with the cellular network NF.

8. A method for protocol data unit (PDU) session management, the method comprising:

initiating a PDU session for an application function (AF) within an application server (AS) that is not part of a cellular network;

transmitting configuration information for an authorization of the AS to a network exposer function (NEF) to communicate directly with a network function (NF) of the cellular network and the AS that is not part of the cellular network to provide PDU services for the PDU session;

receiving authorization of the AS from the NEF based on the configuration information; and communicating directly with the cellular network NF to provide the PDU services during the PDU session.

9. The method of claim 8, wherein:

sending the configuration information comprises sending subscription information to the NEF and parameters including an application identifier for which subscription is requested, and the method further comprises receiving event notifications for the subscription via the NEF.

10. The method of claim 9, wherein the subscription is for an event including at least one of user plane management, mobility, or a user equipment (UE) location.

11. The method of claim 8, wherein:

sending the configuration information comprises sending a traffic rules registration message to the NEF and parameters including an application identifier for which traffic rules apply, and the method further comprises receiving a traffic rules registration acknowledgement via the NEF.

12. The method of claim 8, further comprising:

receiving application service information from the cellular network; and triggering a new PDU session based on the received application service information.

13. The method of claim 8, further comprising:

receiving application service information from the cellular network; and updating an existing PDU session based on the received application service information.

14. The method of claim 8, wherein the AF uses a session management function (SMF) or a policy control function (PCF) for direct communication with the cellular network NF.

15. A non-transitory computer readable medium storing program code for protocol data unit (PDU) session management that, when executed by a processor of an electronic device, causes the electronic device to:

initiate a PDU session for an application function (AF) within an application server (AS) that is not part of a cellular network;

transmit configuration information for an authorization of the AS to a network exposer function (NEF) to communicate directly with a network function (NF) of the cellular network and the AS that is not part of the cellular network to provide PDU services for the PDU session;

receive authorization of the AS from the NEF based on the configuration information; and communicate directly with the cellular network NF to provide the PDU services during the PDU session.

16. The computer readable medium of claim 15, wherein the program code, when executed by the processor of the electronic device, further causes the electronic device to:

send subscription information to the NEF and parameters including an application identifier for which subscription is requested; and receive event notifications for the subscription via the NEF.

17. The computer readable medium of claim 16, wherein the subscription is for an event including at least one of user plane management, mobility, or a user equipment (UE) location.

18. The computer readable medium of claim 15, wherein the program code, when executed by the processor of the electronic device, further causes the electronic device to:

send a traffic rules registration message to the NEF and parameters including an application identifier for which traffic rules apply; and receive a traffic rules registration acknowledgement via the NEF.

19. The computer readable medium of claim 15, wherein the program code, when executed by the processor of the electronic device, further causes the electronic device to:

receive application service information from the cellular network; and the processor is further configured to trigger a new PDU session based on the received application service information.

20. The computer readable medium of claim 15, wherein the program code, when executed by the processor of the electronic device, further causes the electronic device to:
    receive application service information from the cellular network; and update an existing PDU session based on the received application service information.

\* \* \* \* \*